(12) United States Patent
Schmidtberg et al.

(10) Patent No.: US 7,693,739 B2
(45) Date of Patent: Apr. 6, 2010

(54) AUTOMATED GENERATION OF REPORTS REFLECTING STATISTICAL ANALYSES OF SUPPLY CHAIN PROCESSES

(75) Inventors: Rupert A. Schmidtberg, Westford, MA (US); Jeffrey Allen Leshuk, Davis, CA (US)

(73) Assignee: Sensitech Inc., Beverly, MA (US)

(*) Notice: Subject to any disclaimer, the term of this patent is extended or adjusted under 35 U.S.C. 154(b) by 1615 days.

(21) Appl. No.: 10/934,568

(22) Filed: Sep. 3, 2004

(65) Prior Publication Data
US 2005/0055287 A1 Mar. 10, 2005

Related U.S. Application Data

(60) Provisional application No. 60/500,565, filed on Sep. 5, 2003, provisional application No. 60/519,458, filed on Nov. 12, 2003, provisional application No. 60/526,878, filed on Dec. 4, 2003, provisional application No. 60/564,402, filed on Apr. 22, 2004, provisional application No. 60/564,447, filed on Apr. 22, 2004.

(51) Int. Cl.
*G06F 17/50* (2006.01)
(52) U.S. Cl. ........................................ 705/10
(58) Field of Classification Search .......... 705/7
See application file for complete search history.

(56) References Cited

U.S. PATENT DOCUMENTS

| | | | |
|---|---|---|---|
| 4,750,197 A | 6/1988 | Denekamp et al. | |
| 5,117,096 A | 5/1992 | Bauer et al. | |
| 5,686,888 A | 11/1997 | Welles, II et al. | |
| 5,712,789 A | 1/1998 | Radican | |
| 5,758,126 A | 5/1998 | Daniels et al. | |
| 5,835,012 A | 11/1998 | Wilk | |
| 5,864,483 A | 1/1999 | Brichta | |

(Continued)

FOREIGN PATENT DOCUMENTS

| | | |
|---|---|---|
| EP | 1274037 A2 | 1/2003 |
| JP | 01270102 A | 10/1989 |
| JP | 06094489 A | 4/1994 |
| JP | 2002207855 A | 7/2002 |
| WO | WO 99-07121 | 2/1999 |
| WO | WO 03090036 A2 | 10/2003 |

OTHER PUBLICATIONS

Ernest C. Huge, Total Quality: An Executive'S Guide for the 1990's, Chapter 9: Quality of Conformance to Design, pp. 132-151, Publisher: Richard D. Irwin, Inc., U.S., 1990, ISBN 1-55623-1.

(Continued)

*Primary Examiner*—Romain Jeanty
(74) *Attorney, Agent, or Firm*—Kinney & Lange, P.A.

(57) ABSTRACT

The present invention is directed to systems and methods for collecting data concerning a supply chain, for performing statistical analysis on the collected data to facilitate identification of anomalies or inefficiencies in the process, and for communicating results of such statistical analysis to those responsible for the supply chain. A method for performing statistical analysis on monitored aspect of a product supply chain involves storing, in memory accessible to processor, first data reflecting first monitored aspect of a first shipment of first item occurring in the supply chain, and storing, in memory accessible to the processor, second data reflecting second monitored aspect of a second shipment of second item occurring in the supply chain. The processor is used to automatically generate report reflecting statistical analysis of the first and second data.

57 Claims, 13 Drawing Sheets

U.S. PATENT DOCUMENTS

| | | | |
|---|---|---|---|
| 5,892,441 A | 4/1999 | Woolley et al. | |
| 5,936,523 A | 8/1999 | West | |
| 5,937,364 A | 8/1999 | Westgard et al. | |
| 5,959,529 A | 9/1999 | Kail, IV | |
| 6,046,678 A | 4/2000 | Wilk | |
| 6,148,291 A | 11/2000 | Radican | |
| 6,190,313 B1 | 2/2001 | Hinkle | |
| 6,208,253 B1 | 3/2001 | Fletcher et al. | |
| 6,320,512 B1 | 11/2001 | Nicholson et al. | |
| 6,397,163 B1 | 5/2002 | Hoyt et al. | |
| 6,483,434 B1 | 11/2002 | UmiKer | |
| 6,505,094 B2 | 1/2003 | Pape et al. | |
| 6,563,417 B1 | 5/2003 | Shaw | |
| 6,622,101 B1 | 9/2003 | Oechsner et al. | |
| 6,643,608 B1 | 11/2003 | Hershey et al. | |
| 6,712,276 B1 | 3/2004 | Abali et al. | |
| 6,804,563 B1 | 10/2004 | Lafaye de Micheaux | |
| 6,843,415 B2 | 1/2005 | Vogler | |
| 6,847,912 B2 | 1/2005 | Forster | |
| 6,865,516 B1 | 3/2005 | Richardson | |
| 6,871,137 B2 | 3/2005 | Scaer et al. | |
| 6,915,268 B2 | 7/2005 | Riggs et al. | |
| 6,978,217 B2 | 12/2005 | Morozumi et al. | |
| 7,004,621 B2 | 2/2006 | Roberts et al. | |
| 7,174,277 B2 * | 2/2007 | Vock et al. | 702/188 |
| 2002/0000918 A1 | 1/2002 | Hunter | |
| 2002/0082787 A1 | 6/2002 | Woodworth et al. | |
| 2002/0091593 A1 | 7/2002 | Fowler | |
| 2002/0099567 A1 | 7/2002 | Joao | |
| 2002/0138336 A1 | 9/2002 | Bakes et al. | |
| 2002/0156654 A1 | 10/2002 | Roe et al. | |
| 2003/0006907 A1 | 1/2003 | Lovegreen et al. | |
| 2003/0009361 A1 | 1/2003 | Hancock et al. | |
| 2003/0014270 A1 | 1/2003 | Qureshi et al. | |
| 2003/0052776 A1 | 3/2003 | Ricahrds | |
| 2003/0102367 A1 | 6/2003 | Monette et al. | |
| 2003/0135428 A1 | 7/2003 | Smith | |
| 2003/0146854 A1 | 8/2003 | Jones | |
| 2003/0158795 A1 | 8/2003 | Markham et al. | |
| 2003/0227392 A1 | 12/2003 | Ebert et al. | |
| 2004/0056767 A1 | 3/2004 | Porter | |
| 2004/0069850 A1 | 4/2004 | De Wilde | |
| 2004/0103139 A1 | 5/2004 | Hubbard et al. | |
| 2004/0111340 A1 | 6/2004 | Reel et al. | |
| 2004/0153379 A1 | 8/2004 | Joyce et al. | |
| 2004/0233054 A1 | 11/2004 | Neff et al. | |
| 2004/0243353 A1 | 12/2004 | Aghassipour | |
| 2005/0102103 A1 | 5/2005 | Graulich et al. | |
| 2006/0250235 A1 | 11/2006 | Astrin | |

OTHER PUBLICATIONS

"Cadec Corporation Introduces TempTracker to Transportation Industry," Press Release, Dec. 18, 2002; printed from Cadec Corporation website www/cadec.com/news/press_release_detail.asp?id=28, on Mar. 21, 2005.

Cadec Corporation, "Smarter Mobile Logistics: See Beyond the Road," date unknown; printed from Cadec Corporation website www/cadec.com/products/mobius.htm, on Apr. 11, 2003.

Cadec Corporation, "Smarter Mobile Logistics: See Beyond the Road," brochure, date unknown.

Cadec Corporation, "TempTracker™," date unknown; printed from Cadec Corporation website www/cadec.com/products/prod_temptracker.htm, on Apr. 11, 2003.

Cadec Corporation, "Overview—A History of Industry Experience" date unknown; printed from Cadec Corporation website www/cadec.com/products/index.htm, on Apr. 11, 2003.

Sensitech, Inc., Cold Chain Analytics, brochure, date unknown.

Sensitech, Inc., Cold Chain Audit, brochure, date unknown.

Sensitech, Inc., Cold Chain Manager: Shipment Logistics System, brochure, date unknown.

Anonymous, Bridgestone/Firestone develops "active" computer tag that can be incorporated into a tire, Business Wire, Mar. 13, 1995, 3 pages.

Bailes, How support services can use process control, Management Accounting, Oct. 1992, v. 74, No. 4, 9 pages.

Business Eds and High-Tech Writers, WiData announces widata firefly—wireless resource management system for timely and accurate control of supply-chain assets, Business Wire, May 5, 1998, 3 pages.

D. Benson, "Simulation Modeling and Optimization Using Promodel", from Proceedings of the 1997 Winter Simulation Conference, pp. 587-593.

Robert Yuan, "Wireless RF In-Transit Data Logger System (Brief Version)" (Mar. 2003) 4 pages.

"Advances in Cold Chain Management," Florida Association of Food Protection, 2006 Annual Educational Conference.

"Cold Chain Manager User Guide," Sensitech Company, 2003.

"Customizable temperature monitors," Refrigerated & Frozen Foods, Jul. 2002.

"Monitor reduces costs of coverage," Linn, *J. Commerce* Dec. 22, 1999.

"Sensitech adds revolutionary insurance product to service offerings," *Business Wire* Oct. 14, 1999.

"Sensitech and Security Source Partner to Provide Retailers with Multiple Real-Time Management Reporting Tools from Single Scalable Information Platform," *PR Newswire* Jun. 21, 2001.

"Sensitech Inc. Fortifies Position as World Leader in Cold Chain Data Management," *Business Wire* Mar. 9, 1999.

"Sensitech monitors the delivery environment," Fahy, Mass. High Tech, Apr. 8, 1996.

"TempTale Monitors," www.sensitech.com, product data sheet (4 pages).

Webarchive (8 pages), www.sensitech.com, 2001.

* cited by examiner

Shipment Information

House Bill Number 555333
Carrier PDQ
Origin Code ABC
Origin Name Eh Bee See
Destination Code XYZ
Destination Name Ex Wye Zee Shipment Pieces 4
Shipment Weight 97.3 kg

Temperature Profile

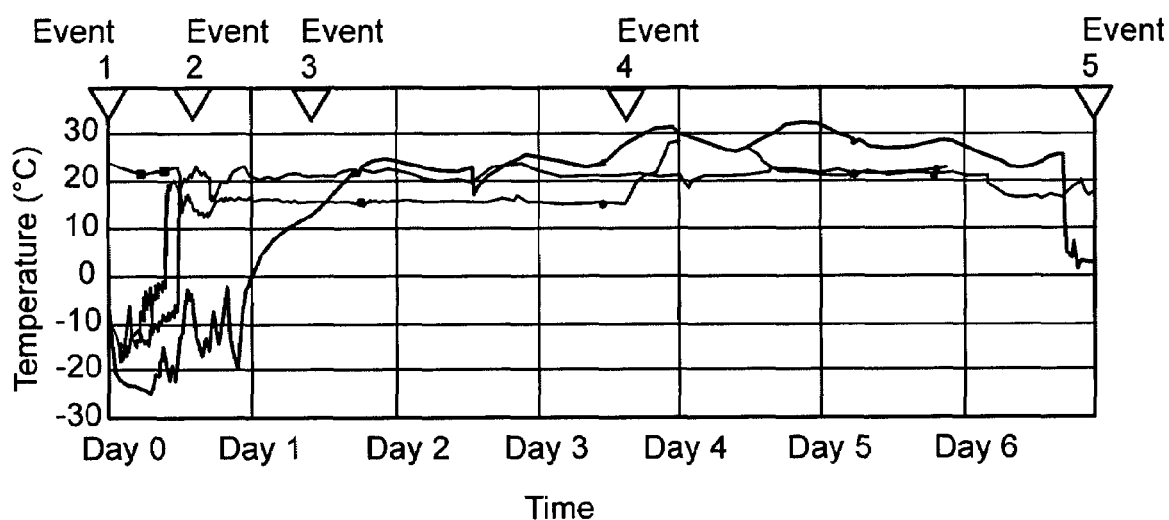

| Event No. | Event Description | Event Time |
|---|---|---|
| 1 | Shipment Received At ABC Origin | 02 MAR 99 / 14:30 |
| 2 | Flt 1: MB# AP4-03029JFK No: APTRK | 02 MAR 99 / 20:00 ETA |
| 3 | Flt 2: MB# 403-02094142 No: PO602 | 05 MAR 99 / 14:00 ETA |
| 4 | Shipment Received At ABC Destination | 07 MAR 99 / 8:00 |
| 5 | Proof Of Delivery | 07 MAR 99 / 12:20 |

FIG. 13

AUTOMATED GENERATION OF REPORTS REFLECTING STATISTICAL ANALYSES OF SUPPLY CHAIN PROCESSES

This application claims the benefit of each of: (1) U.S. Provisional Application Ser. No. 60/500,565, filed Sep. 5, 2003, (2) U.S. Provisional Application Ser. No. 60/519,458, filed Nov. 12, 2003, (3) U.S. Provisional Application Ser. No. 60/526,878, filed Dec. 4, 2003, (4) U.S. Provisional Application Ser. No. 60/564,402, filed Apr. 22, 2004, and (5) U.S. Provisional Application Ser. No. 60/564,447, filed Apr. 22, 2004. The entire disclosure of each of the foregoing applications is hereby incorporated herein by reference.

The present invention is directed generally to novel systems and methods for collecting data concerning one or more aspects of a supply chain and performing a statistical analysis of the supply chain process based on that data.

BACKGROUND

For many companies, one of the most important business processes is the movement of perishable goods through the temperature-controlled portions of a supply chain. In many instances, proper operation of the so-called "cold chain" is critical to maintaining the quality of such goods.

Each year, companies spend millions of dollars on refrigerated staging and processing areas, storage, transport, display and/or specialized packaging. Many of them, however, do not know how well the entire, and very expensive, process works.

Traditional temperature monitoring programs are generally used to make accept/reject decisions or for dispute resolution. They are typically not designed to help a company identify and address problems or inefficiencies in its cold chain. Measuring the effectiveness of the cold chain can enable a company to identify and address such problems or inefficiencies, which might otherwise go undetected.

FIG. 1 is a block diagram of a prior art system 100 for cold chain analysis that has been employed in the past by the assignee of the present invention. As shown, the system 100 included a temperature sensor 102 which was associated with a quantity of product 104 as the product 104 was transported from a shipping location 106 to a receiving location 108. At the shipping location 106, a hand-held data entry device 110 would be used to manually enter data concerning the product 104 and the temperature sensor 102 associated with it. The data entered in the device 110 was then transmitted to a database 112 at a remote location 114. In some circumstances, the shipper would instead communicate information associating the sensor 102 with the product 104 to the remote location 114 in another manner, such as (1) by sending a packing list for the product, including the sensor ID, by facsimile to the remote location 114, (2) by sending a database containing such information to the remote location 114 on a regular basis, e.g., monthly, or (3) by simply writing product identification information on the sensor 102.

Before the product 104 left the shipping location 106, a person manually depressed a "start" button on the sensor 102 so as to cause the sensor 102 to begin logging temperature information at regular intervals, e.g., every five minutes.

After the sensor 102 reached the receiving location 108, someone would either download the information from the sensor 102 via a downloading device 116 and transmit the downloaded data to the database 112 at the remote location 114, or would ship the sensor 102 to the remote location 114, where data would then be downloaded from it and uploaded to the database 112. At this time, the data collected by the sensor 102 would be associated with the shipment information gathered by the handheld device 110 so as to create a complete record containing information about the shipment, its contents, and the data recorded by all associated sensors.

Some sensors 102 were equipped with "stop" buttons, which may or may not have been activated when the sensors 102 and associated products 104 reached the receiving location 108.

FIG. 2 shows an example of how the data would typically appear when it was first uploaded to the database 112. Since all of the uploaded data was not necessarily accumulated during a period of interest, e.g., the sensor 102 may have been started before it was associated with a product 104 or before the product 104 had entered the supply chain being monitored, or may have been stopped after it was separated from the product 104 or after the product 104 had exited the supply chain being monitored, the data had to be "conditioned" so as to reflect only the period of interest. This conditioning was done manually based on the information that was made available to, and the past experience of, the person performing the conditioning, and therefore required that person to make an educated guess concerning the portion of the data that should properly be used for further analysis.

In the example shown in FIG. 2, it appears likely that the sensor 102 was started several hours before it was associated with a product 104 in the cold chain, and was stopped or had data extracted from it approximately one half hour after it was separated from the product 104. Thus, if this raw (unconditioned) data had been used to perform any type of analysis, the results of that analysis would have been inaccurate and unreliable.

FIG. 3 illustrates an example of how beginning and ending locations for the raw data from a sensor 102 were marked during the conditioning step, with the line 302 identifying the beginning point and the line 304 identifying the ending point 304. To determine how the data should be conditioned, a person had to examine the raw data to identify telltale characteristics indicating the likely points where the sensor 102 entered and left the cold chain, and correlate those points with any other information known about the shipment, such as how long such shipments normally took, the approximate times that the shipments began and ended, etc., so as to permit the person to make an educated guess as to where to place the lines 302, 304.

After the data from a sensor 102 had been conditioned, summary data for the entire shipment could be extracted from it into a spreadsheet format. Such summary data generally included parameters such as shipment ID, origin, destination, carrier, product type, average temperature, minimum temperature, maximum temperature, time above the ideal temperature, time below the ideal temperature, trip time, and degree minutes (i.e., the total number of minutes at each degree). After extraction, the summary data could be accessed and processed by a human being using special software programs to manually generate informative graphs and charts.

After these graphs and charts were generated, the human being had to manually transfer them to a server 126 and thereby make them accessible to a customer's computer 128 (FIG. 1) via the Internet 122 for review and analysis. That is, after logging onto a website maintained on the server 126, a customer at the computer 128 could click on one of a pre-defined set of hyperlinks to access a corresponding, pre-generated chart or graph stored on the server 126. In some instances, after accessing such an initial chart or graph, the customer could "drill down" to additional pre-defined charts or graphs stored on the server 126 by clicking on a particular part of the initial chart or graph.

Descriptions of three types of charts and graphs that were generated in this prior art system (a box plot, a control chart, and a histogram) are provided below in connection with FIGS. 4-6. Turning first to FIG. 4, an example is shown of how a box plot 400 for accumulated data was generated. Such a box plot provided a summary of the location, spread, and skewness of a distribution. In the box plot 400, the upper quartile (Q3 or 75th percentile) and the lower quartile (Q1 or 25th percentile) of the data are portrayed by the top 410 and bottom 412, respectively, of a rectangular box 408. Roughly 50% of the data is contained within the box 408. The median (50th percentile) is portrayed by a horizontal line segment 402 within the box 408.

The lines 404 that extend from the ends 410, 412 of the box 408, called the "whiskers," are based on the data in the tails of the data and help show the spread of the distribution. The whiskers 404 extend to the most extreme point within a calculated range (e.g., one and one-half times the distance between the ends 410, 412) beyond each end 410, 412 of the box 408. Points falling beyond the whiskers are indicated by individual stars 406. These points are potential outliers, since they are significantly different from the rest of the observations.

If the median line 402 cut the box 408 in half and the whiskers 404 on either end 410, 412 extended about the same distance from the box 408, then the distribution was symmetrical. Lack of symmetry would indicate that the data may not have come from a normal distribution. If the data was normally distributed, then roughly 99% of the data would have been contained between the whiskers 404 of the box plot 400.

FIG. 5 shows an example of a control chart 500 generated using the prior art system discussed above. Such control charts helped the user understand what their current supply chain processes were capable of and how much variation (about the mean) to expect from the current process. Such charts also allowed the user to determine whether variations from point to point were due to expected random variation or due to an assignable cause. Basically, a control chart is a run chart that includes statistically generated upper and lower control limits. The purpose of a control chart was to detect any unwanted changes in the process being analyzed. Abnormal points or certain patterns in the graph signal would reveal these changes.

Extensive research by statisticians has shown that by establishing upper and lower limits at three times the standard deviation of the process (plus and minus, respectively), 99.73% of the random variation would fall within these limits. When a point falls outside the control limits or when certain patterns occur in the data, it is usually due to an assignable cause. A process is therefore said to be in "statistical control" when the process measurements vary randomly within the control limits; that is, the variation present in the process is consistent and predictable over time. The upper and lower control limits are not the same as tolerance or specification limits. Control limits are a function of the way a process actually performs over time. Specification, or tolerance, limits, on the other hand, are a function of what people want the process to do, and may not have any direct relationship to the actual capabilities of the process.

Control charts such as that shown in FIG. 5 have three basic components: (1) performance data 502 plotted over time, (2) a centerline (CL) 504, which is the mathematical average of all the samples plotted, and (3) upper 506 and lower 508 statistical control limits (UCL & LCL) that define the constraints of common cause variations.

In the prior art system 100 discussed above, the control limits 506, 508 were used in conjunction with control charts 500 to help interpret temperature-related data accumulated by sensors 102. Control limits 506, 508 reflected the expected variation in the temperature of the cold chain being monitored. Results that fell outside of these limits were considered to be "out of control" points and would have suggested that some abnormal cause had acted on the cold chain. If the temperature data fluctuated within the limits 506, 508, it was assumed to be the result of common causes within the process (flaws inherent in the process), and could only have been affected if the system was improved or changed. If the temperature data fell outside of the limits 506, 508, it was assumed to be the result of special causes.

In the prior art system 100, several tests were used to spot variations due to assignable causes on a control chart 500: (1) one data point falling outside the control limits, (2) six or more points in a row steadily increasing or decreasing, (3) eight or more points in a row on one side of the centerline, and (4) fourteen or more points alternating up and down. These tests were conducted manually by a human being. That is, a human being had to visually inspect the control charts for the presence of one or more of the above patterns.

FIG. 6 shows an example of a histogram 600 generated using the prior art system discussed above. A histogram, such as the histogram 600, is a graphical representation of a set of measurements. It consists of columns drawn over class intervals, the heights of which are proportional to the number of measurements falling within a given interval.

A histogram is constructed from a frequency table. A frequency table is constructed by dividing the data collected into intervals or "bins," and then counting the number of data points falling within each interval. A graph consisting of several columns is then constructed, with the height of each column being determined by the number of data points collected in a corresponding interval. In the histogram 600, the height of each column indicates the number of shipments during which the measured minimum temperature fell within a respective five degree range of temperatures.

The following example is illustrative of how the above-described charts and graphs stored on the server 126 were accessed by a customer using the prior art system 100. First, after logging onto a website maintained by the server 126, the customer could select a hyperlink corresponding to a particular characteristic (e.g., mean temperature) from among a group of such hyperlinks (e.g., mean temperature, minimum temperature, maximum temperature, degree-minutes >0° F., time >0° F., and trip time). In response to that selection, a pre-selected and pre-generated group of box plots 400 stored on the server 126 could be displayed that were segregated according to some pre-defined criterion (e.g., by the distribution centers through which monitored product flowed). The user could then click on one of the box plots 400 to access a pre-generated control chart 500 stored on the server 126 that included a set of data points upon which the selected box plot was based. The user could then click on one of the data points 502 in the control chart 500 to retrieve from the server 126 either a graph of data from, or a summary chart of information relating to, the trip with which the selected data point 502 corresponded. In some prior art systems the customer could also retrieve from the server 126 a pre-generated histogram 600 for the originally selected criterion, e.g., mean temperature.

In such systems, all of the charts and graphs available for display to the customer were generated and stored on the server 126 sometime before the customer logged onto the website. Once uploaded to the server 126, the content of, and available formats for, those charts and graphs was essentially fixed unless and until new or different charts and graphs were separately generated and uploaded to the server 126. Thus, while the customer was able to select from among a number of pre-selected and pre-generated charts and graphs that had been uploaded to the server 126, the customer's control of (1) which charts and graphs were generated and therefore available for review, (2) the content of the available charts and graphs, and (3) the format in which the available charts or graphs were presented, was limited to requesting that additional or different charts or graphs be manually created and made available via additional hyperlinks on the website.

Returning again to FIG. 1, for purposes entirely unrelated to the monitoring of temperature, in advance of sending a shipment of product 104, a computer 118 at the shipping location 106 typically sent an advanced shipping notification (ASN), sometimes alternatively referred to as "dispatch advice," an "advance ship notice," a "bill of lading," a "ship notice/manifest," etc., over the Internet 122 to a computer 120 at the receiving location 108. As used herein, "advanced shipping notification" is intended to broadly encompass all such notice types. An example of an extensible markup language (XML) file structure for an ASN is attached as Appendix A, to provisional application Ser. No. 60/500,565, incorporated by reference above. Another example of an ASN file structure is set forth in electronic data interchange (EDI) transaction set 856. In addition to other pieces of information, the ASN generally included a tracking number for the shipment. With the tracking number, either of the computers 118 or 120 could access a server 124 maintained by the carrier to track the product 104 through the cold chain. Operators of the computers 118 and 120 could therefore retrieve from the server 124 information such as when the product 104 left the shipping location 106 and arrived at the receiving location 108, as well as occasions on which the product 104 reached certain transition points along the way that were recorded by the carrier.

SUMMARY

A product supply chain may be viewed not just as a series of discrete, unrelated shipment transactions, but as a "process" (or pipeline) that can be subject to statistical process control. The present invention is directed to novel systems and methods for collecting data concerning one or more aspects of a supply chain, for performing statistical analysis on the collected data to facilitate the identification of anomalies or inefficiencies in the process, and for communicating the results of such statistical analysis to those responsible for the supply chain so that remedial measures may be taken, if appropriate.

According to one aspect of the present invention, a method for performing statistical analysis on at least one monitored aspect of a product supply chain involves storing, in memory accessible to at least one processor, first data reflecting at least one first determined value of at least one monitored aspect of a first shipment of at least one first item occurring in the supply chain, and storing, in memory accessible to the at least one processor, second data reflecting at least one second determined value of at least one monitored aspect of a second shipment of at least one second item occurring in the supply chain. The at least one processor is used to automatically generate at least one report reflecting a statistical analysis of the first data and the second data.

According to another aspect, a system for performing statistical analysis on at least one monitored aspect of a product supply chain comprises at least one memory and at least one processor. The at least one memory has stored therein first data reflecting at least one first determined value of at least one monitored aspect of a first shipment of at least one first item occurring in the supply chain, and having further stored therein second data reflecting at least one second determined value of at least one monitored aspect of a second shipment of at least one second item occurring in the supply chain. The at least one processor is coupled to the at least one memory and is configured to automatically generate at least one report reflecting a statistical analysis of the first data and the second data.

According to another aspect, a system for performing statistical analysis on at least one monitored aspect of a product supply chain comprises means for storing first data reflecting at least one first determined value of at least one monitored aspect of a first shipment of at least one first item occurring in the supply chain, and means for storing second data reflecting at least one second determined value of at least one monitored aspect of a second shipment of at least one second item occurring in the supply chain. The system further comprises means, coupled to the means for storing first data and the means for storing second data, for automatically generating at least one report reflecting a statistical analysis of the first data and the second data.

According to another aspect, a computer-readable medium is disclosed for use with at least one processor included in a system including at least one memory having stored therein first data reflecting at least one first determined value of at least one monitored aspect of a first shipment of at least one first item occurring in a supply chain, and having further stored therein second data reflecting at least one second determined value of at least one monitored aspect of a second shipment of at least one second item occurring in the supply chain. The computer-readable medium has a plurality of instructions stored thereon which, when executed by the at least one processor, cause the at least one processor to automatically generate at least one report reflecting a statistical analysis of the first data and the second data.

According to another aspect of the present invention, a method for analyzing a supply chain process involves automatically determining whether a plurality of data points, each representing at least one determined value of at least one monitored aspect of a supply chain, match a pattern indicative of an anomalous condition in the supply chain process.

According to another aspect, a system for analyzing a supply chain process comprises at least one processor configured to automatically determine whether a plurality of data points, each representing at least one determined value of at least one monitored aspect of a supply chain, match a pattern indicative of an anomalous condition in the supply chain process.

According to another aspect, a computer-readable medium is disclosed for use with at least one processor included in a system including at least one memory having stored therein data representing a plurality of data points, each data point representing at least one determined value of at least one monitored aspect of a supply chain. The computer-readable medium has a plurality of instructions stored thereon which, when executed by the at least one processor, cause the at least one processor to automatically determine whether the plurality of data points match a pattern indicative of an anomalous condition in the supply chain process.

According to another aspect, a method for analyzing a supply chain process involves automatically determining whether any of a plurality of data points representing determined values of at least one monitored aspect of a supply chain falls without statistical process control limits for the supply chain process.

According to another aspect, a system for analyzing a supply chain process comprises at least one processor configured to automatically determine whether any of a plurality of data points representing determined values of at least one monitored aspect of a supply chain falls without statistical process control limits for the supply chain process.

According to another aspect, a computer-readable medium is disclosed for use with at least one processor included in a system including at least one memory having stored therein data representing a plurality of data points, with each data point representing at least one determined value of at least one monitored aspect of a supply chain. The computer-readable medium has a plurality of instructions stored thereon which, when executed by the at least one processor, cause the at least one processor to automatically determine whether any of the plurality of data points falls without statistical process control limits for the supply chain process.

According to another aspect of the present invention, a method is disclosed for use in a system in which at least one first sensor is associated with at least one first item that is transported from a first shipping location to a first receiving location so that the at least one first sensor can monitor at least one physical or environmental condition of the at least one first item as the at least one first item is so transported. The method comprises storing first data accumulated by the at least one first sensor in memory, with at least some of the first data reflecting changes in the at least one physical or environmental condition of the at least one first item that occurred when the at least one first sensor was associated with the at least one first item, and automatically identifying at least a portion of the first data as having been accumulated when the at least one first sensor was associated with the at least one first item.

According to another aspect, a computer-readable medium is disclosed for use with at least one processor included in a system in which at least one first sensor is associated with at least one first item that is transported from a first shipping location to a first receiving location so that the at least one first sensor can monitor at least one physical or environmental condition of the at least one first item as the at least one first item is so transported, and in which first data accumulated by the at least one first sensor is stored in memory, with at least some of the first data reflecting changes in the at least one physical or environmental condition of the at least one first item that occurred when the at least one first sensor was associated with the at least one first item. The computer-readable medium has a plurality of instructions stored thereon which, when executed by the at least one processor, cause the at least one processor to automatically identify at least a portion of the first data as having been accumulated when the at least one first sensor was associated with the at least one first item.

According to another aspect of the present invention, a method involves storing, in memory accessible to at least one processor, an electronic copy of an advanced shipping notification (ASN) that was transmitted from a shipping location to a receiving location in advance of shipping at least one item therebetween, and also storing, in memory accessible to the at least one processor, data reflecting at least one determined value of at least one monitored aspect of the shipment between the shipping location and the receiving location. The at least one processor uses at least some information from the ASN stored in memory, together with at least a portion of the data stored in memory, to generate at least one report involving the at least one determined value.

According to another aspect, a database has stored therein an electronic copy of an advanced shipping notification (ASN) that was transmitted from a shipping location to a receiving location in advance of shipping at least one item therebetween, and further has stored therein data reflecting at least one determined value of at least one monitored aspect of the shipment of the at least one item.

According to another aspect, a computer-readable medium is disclosed for use with at least one processor included in a system including at least one memory accessible to the at least one processor that has stored therein an electronic copy of an advanced shipping notification (ASN) that was transmitted from a shipping location to a receiving location in advance of shipping at least one item therebetween, and having further stored therein data reflecting at least one determined value of at least one monitored aspect of the shipment of the at least one item. The computer-readable medium has a plurality of instructions stored thereon which, when executed by the at least one processor, cause the at least one processor to use at least some information from the ASN stored in memory, together with at least a portion of the data stored in memory, to generate at least one report involving the at least one determined value.

According to another aspect, a method involves transmitting an advanced shipping notification (ASN) from a shipping location to a receiving location in advance of shipping at least one item therebetween. The ASN comprises an identifier that identifies a sensor that will be used to monitor at least one physical or environmental condition of the at least one item as the item is transported between the shipping location and the receiving location.

According to another aspect, an advanced shipping notification (ASN), which is transmitted from a shipping location to a receiving location in advance of shipping at least one item therebetween, comprises an identifier that identifies a sensor that will be used to monitor at least one physical or environmental condition of the at least one item as the item is transported between the shipping location and the receiving location.

According to another aspect of the present invention, a method involves storing, in memory accessible to at least one processor, data reflecting at least one determined value of at least one monitored aspect of a shipment of at least one item from a shipping location to a receiving location, and also storing, in memory accessible to the at least one processor, location event information corresponding to the shipment of the at least one item from the shipping location to the receiving location. The at least one processor uses the location event information stored in memory, together with the data stored in memory, to generate at least one report involving the at least one determined value.

According to another aspect, a database has stored therein data reflecting at least one determined value of at least one monitored aspect of a shipment of at least one item from a shipping location to a receiving location, and has further stored therein location event information corresponding to the shipment of the at least one item from the shipping location to the receiving location.

According to another aspect, a computer-readable medium is disclosed for use with at least one processor included in a system having at least one memory accessible to the at least one processor having stored therein data reflecting at least one determined value of at least one monitored aspect of a shipment of at least one item from a shipping location to a receiving location, and having further stored therein location event information corresponding to the shipment of the at least one item from the shipping location to the receiving location. The computer-readable medium has a plurality of instructions stored thereon which, when executed by the at least one processor, cause the at least one processor to use the location event information stored in memory, together with the data stored in memory, to generate at least one report involving the at least one determined value.

BRIEF DESCRIPTION OF THE DRAWINGS

FIG. 13 shows an example of temperature graph that may presented to the user which reflects location event information in accordance with one aspect of the present invention.

DETAILED DESCRIPTION

Figure 1:
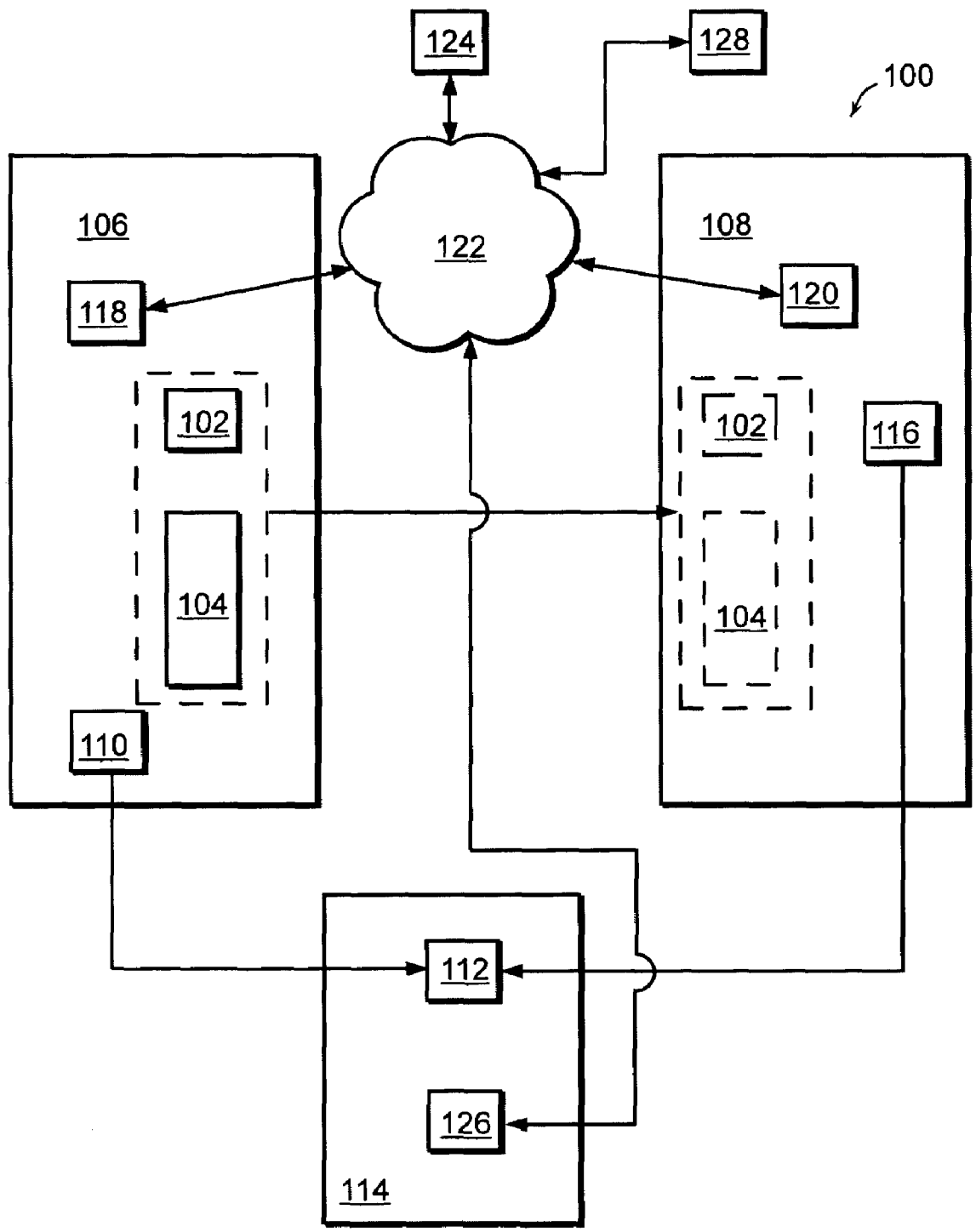
FIG. 1 is a block diagram illustrating a prior art system for monitoring temperature conditions during one or more shipments of product.
Figure 2:
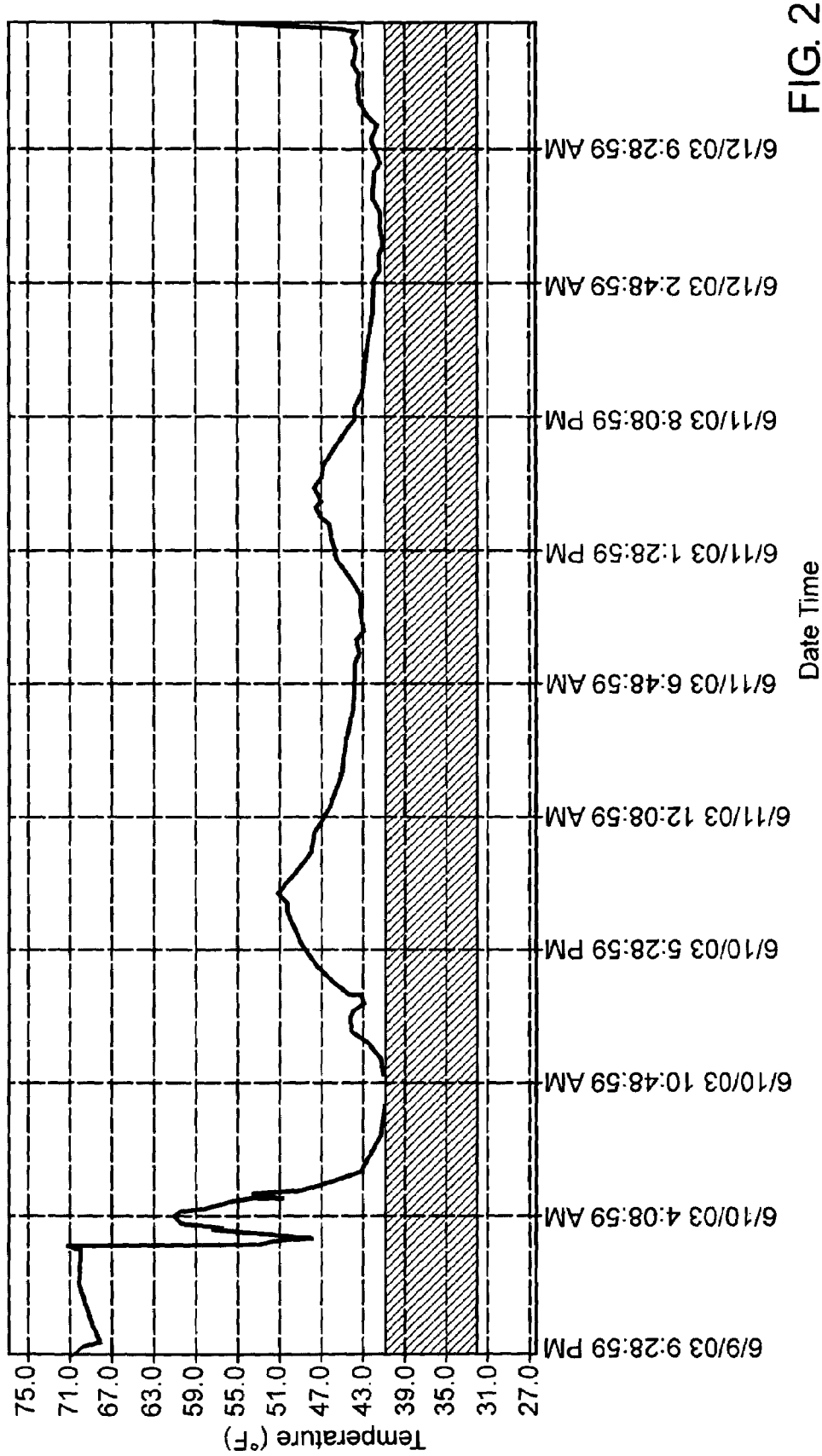
FIG. 2 is a graph showing a typical waveform that was output by one of the sensors shown in the system of FIG. 1.
Figure 3:
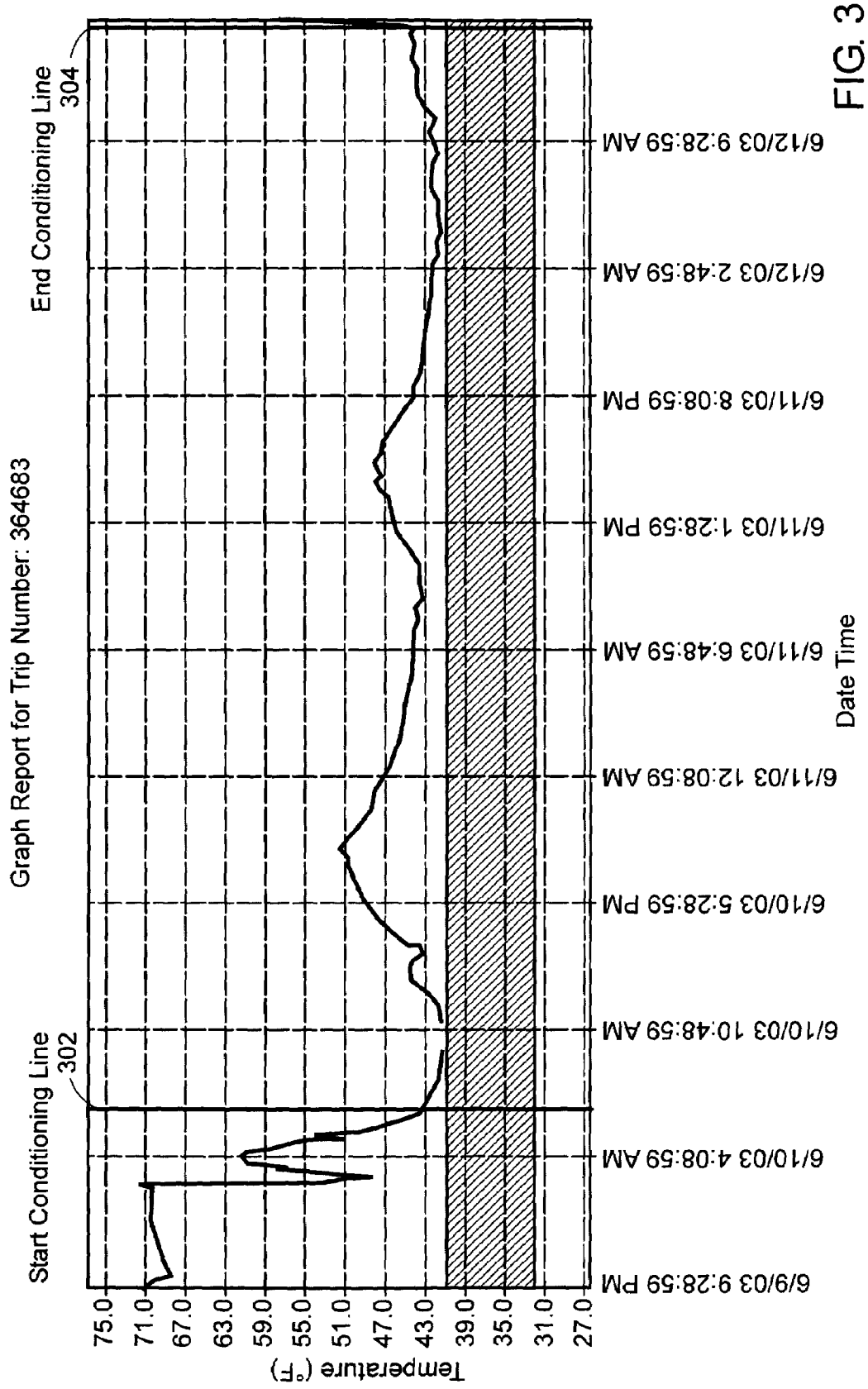
FIG. 3 is a graph showing how conditioning lines were manually added to graphs like that shown in FIG. 2.
Figure 4:
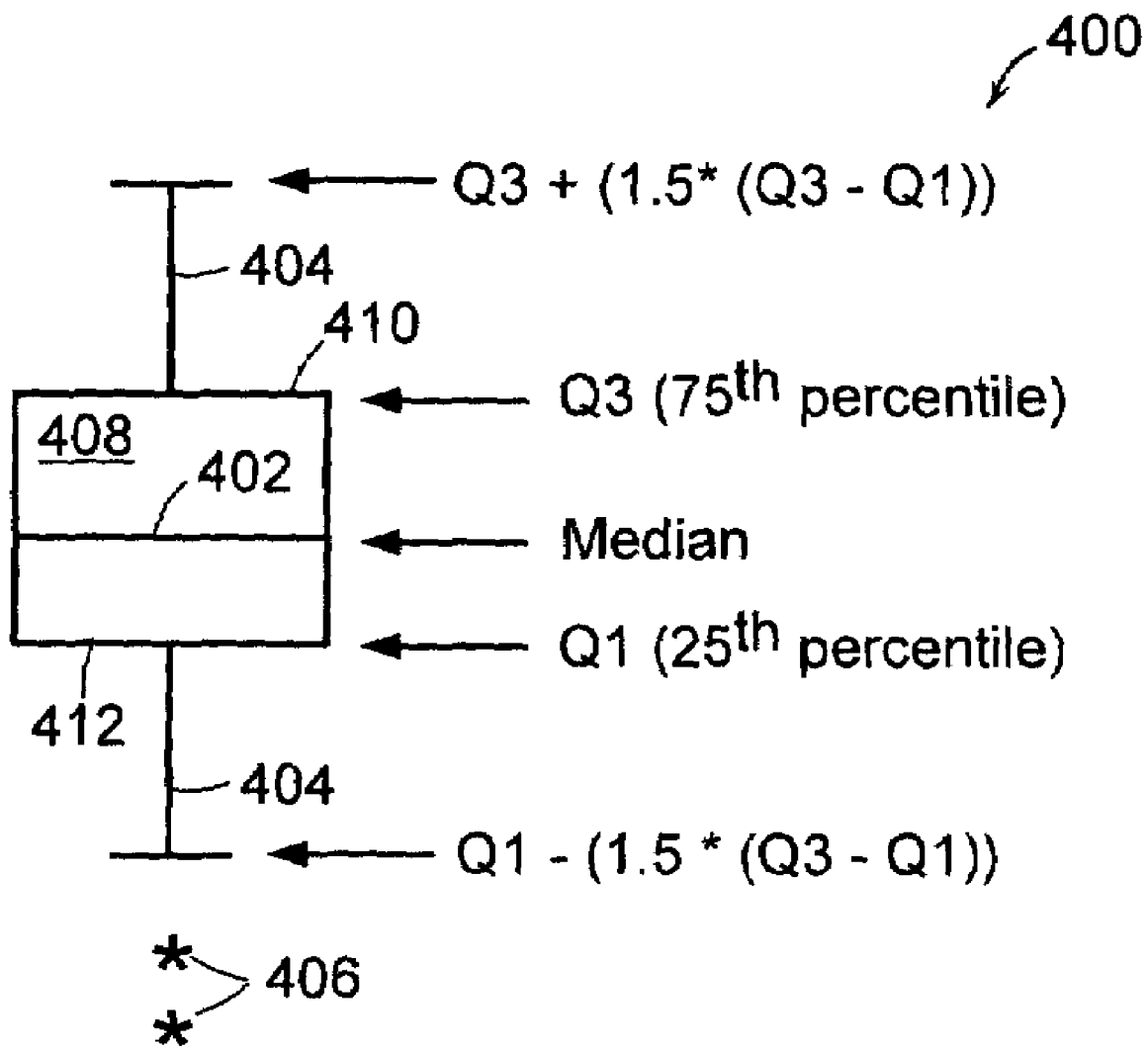
FIG. 4 shows an example of a box plot generated based upon a statistical analysis of accumulated data.
Figure 5:
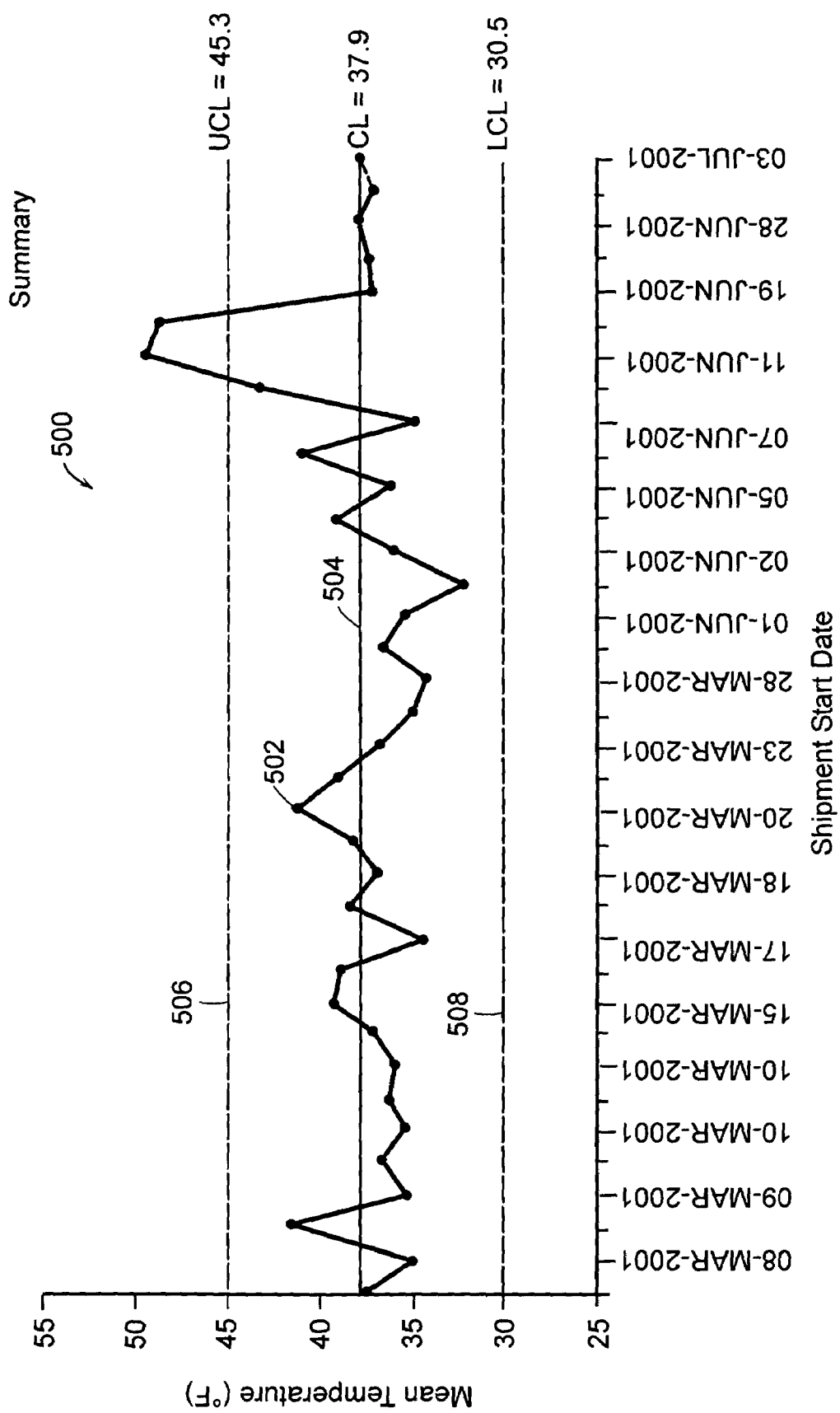
FIG. 5 shows an example of a control chart generated based upon a statistical analysis of accumulated temperature data.
Figure 6:
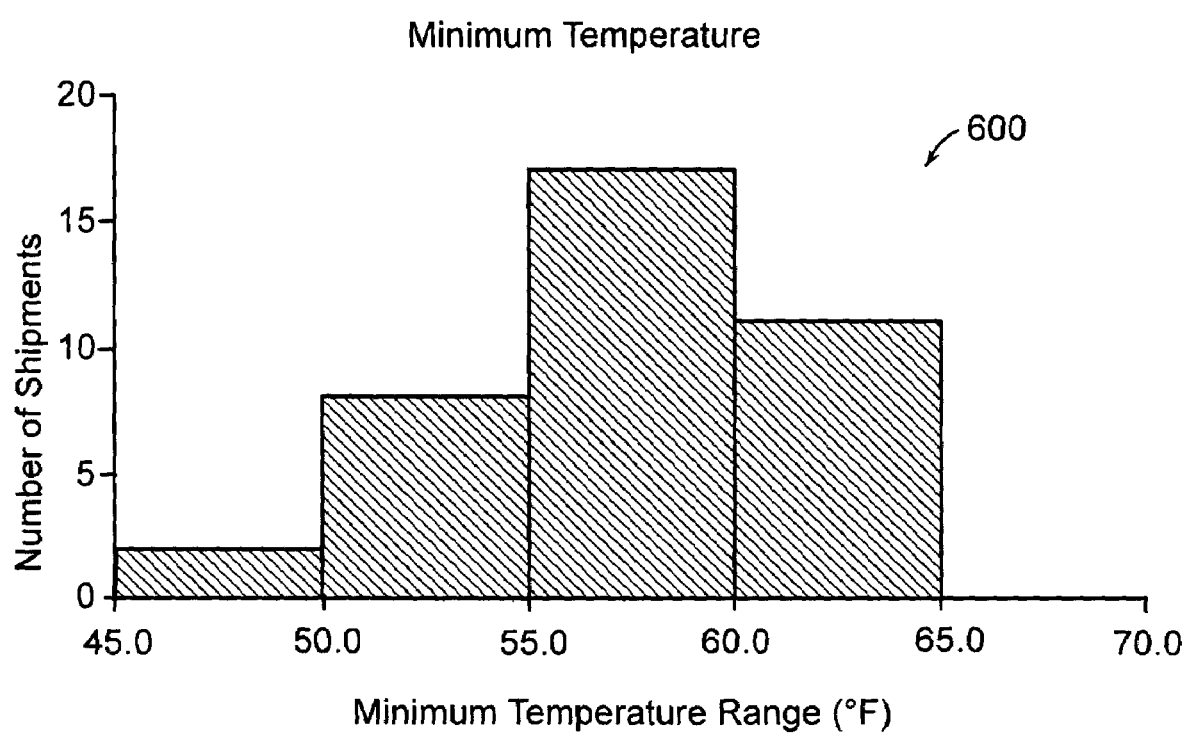
FIG. 6 shows an example of a histogram generated based upon a statistical analysis of accumulated temperature data.

As noted above, a product supply chain may be viewed not just as a series of discrete, unrelated shipment transactions, but as a "process" (or pipeline) that can be subject to statistical process control. As used herein, "supply chain" refers to any mechanism by which product is transported between at least two points, and may encompass any situation in which one or more product types are transported by one or more carriers from one or more origins, either directly or through one or more distribution centers or intermediate holding locations, to one or more destinations, or even just some portion or leg of the foregoing, e.g., from a particular distribution center to a particular destination. It is not uncommon in a supply chain for a quantity of product to be transferred in bulk during one or more initial legs, to be broken down into pallets for transfer during one or more additional legs, and then further broken down into cartons or mixed with other products for transfer during one or more final legs. This entire series of transfers would be considered to be a "supply chain" as that term is used herein, as would any single portion or leg, or combination of portions or legs, of such a series of transfers.

By regularly accumulating data concerning one or more aspects of various shipments in a supply chain, and making reports based on a statistical analysis of that data readily accessible to a user, the supply chain "process" can be efficiently and effectively analyzed by the user. By using proper analytical techniques, various inefficiencies and/or anomalies in the process can be brought to light in such reports, so that measures can be taken promptly and efficiently to ameliorate the same.

In some embodiments, the data accumulation and/or report generation processes may be fully automated so that reports can be generated automatically (by one or more computers) based on accumulated data any time a user electronically submits a request for such a report. As used herein, "automated" and "automatically" are used to refer to any action or set of actions that are taken without human intervention, e.g., a computer-implemented process. That a human being requests a computer to perform a process does not mean that the process performed by the computer in response to that request is not automated.

Reports may additionally or alternatively be generated automatically on a regular basis (e.g., once a day, once a week, once a month, etc.), or perhaps in response to certain events such as the accumulation of a new piece of data. Such automatically generated reports may also be analyzed automatically to identify patterns indicative of inefficiencies or anomalies in the process. Whenever such a pattern is identified pursuant to such automated analysis, one or more users may be notified automatically, e.g., by e-mail, pager, fax, etc., so that they may know to access one or more reports reflecting the identified pattern. Notified individuals may then, if appropriate, promptly take remedial measures and potentially avoid serious consequences resulting from the identified anomaly. The reported information may further enable the notified individuals to proactively avoid similar or related anomalous situations in the future by manipulating or revamping various aspects of the process.

Data that may be used to perform the statistical analysis on the process, and report generation based thereupon, may be accumulated from any of a number of sources, and may include one or more of (1) data from sensors that monitor a physical or environmental condition of a product in a supply chain, (2) information concerning particular shipments and their contents (e.g., from ASN's), (3) and location event information (discussed below). Accordingly, huge amounts of raw data may be consolidated into a simple, understandable form for easy identification of problems or inefficiencies in the supply chain.

Figure 7:
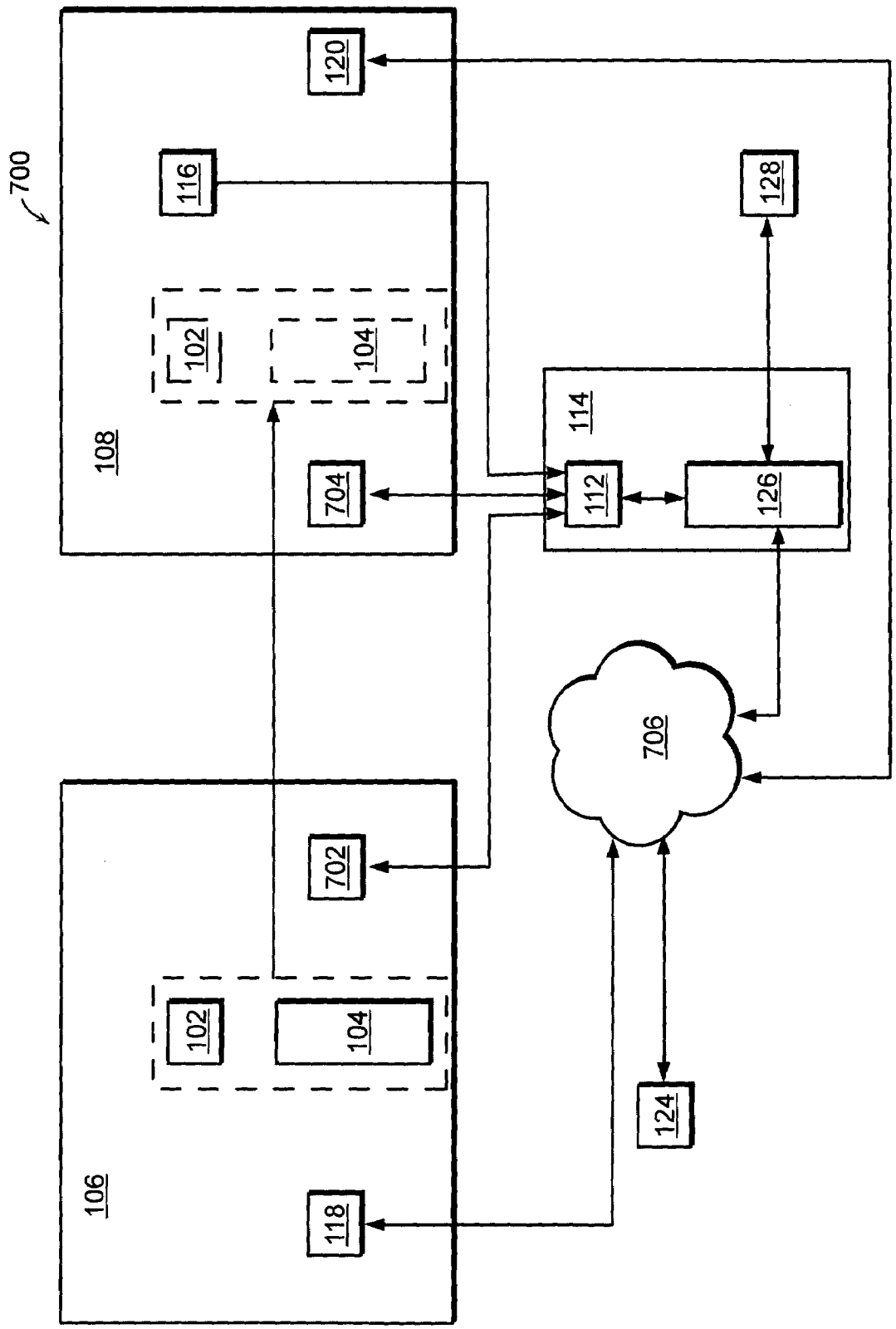
FIG. 7 shows an example embodiment of a system embodying several aspects of the present invention.

An example of a system 700 embodying several aspects of the present invention is depicted in FIG. 7. As shown, the system 700 may include one or more sensors 102 which are associated with a quantity of product 104 so as to monitor a physical or environmental condition of the product 104 as it passes through a supply chain. Sensors 102 may be associated with the product 104 in any of a number of ways, and the invention is not limited to any particular method of association. It is important only that each sensor 102 be arranged with respect to the product 104 so that, during transport, it is capable of monitoring the physical or environmental characteristic of interest.

In some embodiments, the sensors 102 may be physically associated with the product 104 so that they remain physically associated with the product 104 in substantially the same way (1) before and after the product 104 is loaded from a shipping location 106 or an intermediate holding area (not shown) onto a transport vehicle (e.g., a truck, ship, plane, train car, etc.—not shown), (2) before and after the product 104 is transferred between transport vehicles, and/or (3) before and after the product 104 is unloaded from a transport vehicle to an intermediate holding area or the receiving location 108. Alternatively, one or more vehicles or holding areas may have one or more sensors 102 physically associated with them so that the sensors 102 remain physically associated with the vehicles or holding areas before and after the product 104 is loaded thereon or removed therefrom.

In alternative embodiments, other aspects or parameters of the shipment process may additionally or alternatively be monitored. For example, the trip time of each shipment, the trip distance for each shipment, the time spent on each transporting vehicle, and/or the time spent at each location before, after, or between shipments, may be measured and data reflecting the same may be accumulated for later analysis and/or report generation. In such embodiments, sensors 102 would not be required, as such variables could be measured simply by somehow determining when a product 104 left each shipping location 106 and arrived at each receiving location 108, and/or when a product was loaded onto and unloaded from each transporting vehicle. One way this may be accomplished without using sensors 102 is, for example, through the interrogation of RFID tags (not shown) or scanning of bar codes (not shown) associated with the product 104 at various locations. Such information may alternatively be ascertained by using a tracking number to access electronic records reflecting departure and arrival times, etc., that are maintained by the carrier responsible for a shipment.

For the sake of simplicity, the description that follows will focus primarily on the use of one or more temperature sensors to track temperature conditions in a cold chain. It should be appreciated, however, that the invention is not so limited, and any of a number of different types of sensors 102 can be additionally or alternatively be employed to track additional or different physical or environmental conditions of the product 104 during any portion(s) or leg(s) of its supply chain. The sensors 102 shown in FIG. 7 may, for example, additionally or alternatively be capable of monitoring humidity, incident light, exposure to x-rays or other radiation, pressure, shock, impact, presence or quantity of airborne particles, viscosity, volume, speed, acceleration, orientation, etc. In addition, as mentioned above, some embodiments of the invention need not employ sensors 102 at all, and instead may track and perform statistical analysis on an aspect of the shipping process unrelated to a physical or environmental condition of the product, such as "trip time" for one of more legs of a shipment, time spent at particular product locations (e.g., at particular warehouses or on particular vehicles) or the total distance traveled during a shipment (i.e., "trip distance").

As used herein, "cold chain" means any transportation chain for product in which the temperature of the environment in which the product is held is controlled, and is not limited to situations in which products are kept "cold."

In some embodiments, the sensors 102 may additionally or alternatively identify "alarm" conditions and log data reflecting times at which such conditions occurred or were detected. Alarms may be generated, for example, when a particular maximum or minimum temperature is exceeded, when a particular temperature condition is found to exist for more than a threshold period of time, etc.

The sensors 102 may additionally have some processing capability or "intelligence," enabling them to calculate and log statistics such as average temperature, mean kinetic temperature, times above or below thresholds, times within or without temperature ranges, etc. In some embodiments, specialized sensors capable of operating at cryogenic temperatures may be employed. An example of such a sensor is described in U.S. Provisional Application Ser. No. 60/519,458, filed Nov. 11, 2003, the entire disclosure of which is hereby incorporated herein by reference.

It should be appreciated that the system 700 may also include additional equipment for monitoring the supply chain during multiple trips between the shipping location 106 and the receiving location 108 and/or for monitoring the supply chain between additional shipping and/or receiving locations, with relevant information concerning such other trips or other shipping routes also being communicated to the remote location 114 in a similar fashion. As discussed in more detail below, the accumulation of information from multiple trips and/or shipping routes in this manner enables the generation of statistical data, as well as useful charts and graphs using the same, that can be monitored and analyzed by trained personnel to identify problems or inefficiencies in a supply chain, and to evaluate how the performance of a supply chain measures up to certain industry benchmarks.

In contrast to the prior art system 100, the conditioning of the data logged by the sensors 102 may be automated, i.e., may be performed without human intervention, so that the processing and compilation of that data into a useful format can also be performed automatically. In the embodiment of FIG. 7, this automatic conditioning may be accomplished using any of a number of techniques, or some combination thereof.

As a first option, the system 700 may employ RF units 702, 704 at the shipping and receiving locations. The RF units 702, 704 may, for example, be RF receivers or transceivers configured and arranged to receive RF signals from the sensors 102 at the beginning and end of the supply chain being monitored. The received RF signals may contain information that uniquely identifies the sensors 102 so as to distinguish them from other sensors 102. The temperature sensors 102 in such an example may continuously or periodically transmit signals for receipt by the RF units 702, 704, or may contain RFID transponders that broadcast RF signals in response to an interrogation signal from the RF units 702, 704. In some embodiments, RFID transponders containing a dynamic electronic product code (EPC), i.e., an EPC that can be altered dynamically to reflect a condition of the product 104, may be employed for this purpose. An example of such a transponder suitable for such an application is described in U.S. Provisional Application Ser. No. 60/475,554, the entire disclosure of which is hereby incorporated herein by reference.

In the above situation, the RF units 702 and 704 may therefore communicate the starting and ending times of the supply chain for the product 104 to the database 112 at the remote location 114. In addition, the temperature data accumulated by the sensor 102 and ultimately uploaded to the database 112 may be time stamped. The database 112 may thus be caused to contain sufficient information, i.e., time stamped data and the starting and stopping times for that data, to automatically condition the temperature data received from the sensor 102.

In some embodiments, location event information may additionally or alternatively be recorded in an RFID tag associated with the product 104, either as a part of the sensor 102 or as a separate device. Examples of systems and techniques for accomplishing such a result are described in U.S. Provisional Application Ser. No. 60/564,447, filed on Apr. 22, 2004, the entire disclosure of which is hereby incorporated herein by reference.

Alternatively, the RF units 702, 704 may simply transmit signals to the sensors 102 that instruct the sensors 102 to start and stop recording temperature data at the beginning and ending points of their journey. In this manner, the sensors 102 may themselves automatically condition the data by recording data only during the relevant portion of the supply chain. As mentioned above, in some embodiments, the sensors 102 may even contain sufficient "intelligence" to recognize and record the occurrence of alarm conditions and/or to calculate and log statistical information during the journey. For example, the sensors 102 may record the occurrence of alarm conditions in response to determining that minimum and/or maximum temperatures have been reached or have been exceeded for a particular time period, etc., and/or may calculate and log information such as the average temperature, the mean kinetic temperature, time above or below a particular temperature or within or without a particular temperature range.

The temperature data and/or location event information recorded by the sensors 102 may be communicated to the database 112 in any of a number of ways, and the invention is not limited to any particular mode of communication. In some embodiments, the temperature data and/or location event information from the sensors 102 may be communicated from the sensors 102 to the RF unit 704 and/or intermediate RF units via RF signals. Alternatively, the data and/or location event information may be downloaded from the sensors 102 at the receiving location 108 (e.g., using the downloading device 116), at the remote location 114, or at some other location remote from the receiving location 108.

Additional RF units (not shown) may also be disposed at various points along the supply chain to make available further information concerning times at which particular milestones, e.g., the leaving of a shipping location, the reaching a distribution center, the arrival at a receiving location or, the changing of hands from one carrier to another, or the transfer from one vehicle to another are reached during the product's journey. In some embodiments, data and/or recorded location event information may also be downloaded from the sensors 102 at these intermediate locations. As discussed in more detail below, information concerning the times and locations at which such milestones occur, hereafter "location event information," may be advantageously used together with other data stored in the database 112 for the purpose of analyzing the performance of the supply chain and various legs thereof. For instance, location event information may be used together with time-stamped temperature data to determine the average temperature a product was subjected to while it was disposed in a particular warehouse or on a particular vehicle. A similar determination may additionally or alternatively be made based upon the "marking" of temperature data (or data accumulated by some other type of sensor) with location event information, as described in U.S. Provisional Patent Application Ser. No. 60/564,447, incorporated by reference above.

For some applications, an RF unit 702, 704 at only one of the two locations 106, 108 could be used if it were known that either the beginning or ending part of the data from the monitors 108 would not need conditioning, for example, if it was known that the pressing of a start or stop button on the sensors 102 would be performed in a reliable manner at one of the two locations.

A second approach that may be employed, either alone or in combination with one or more aspects of the RF approach discussed above, to automatically condition data received from the sensors 102 is to obtain location event information from the carrier(s) that shipped the product 104. With reference to FIG. 7, one way this may be accomplished is to make one or more tracking numbers, e.g., a FedEx tracking number, available to the server 126 at the remote location 114, which enables the server 126 to retrieve location event information from one or more servers 124 maintained by the carrier(s) responsible for transporting the product 104. If the data logged by the sensors 102 is time stamped, the location event information retrieved from the server 124 can itself be used to automatically condition the data, because the location event information would provide, among other information, the time at which the product 104 left the shipping location 106 and the time at which it arrived at the receiving location 108.

Moreover, as noted above, in addition to or in lieu of such conditioning of data, location event information may be used to select particular portions of conditioned data that should be used to generate particular reports. For example, if a sensor 102 was associated with a product 104 from when it left a shipping location 106 to when it arrived at a receiving location 108, after having passed through several distribution centers and/or been transferred between many vehicles, location event information could be used to identify a portion of the sensor's data corresponding to a time period that the product 104 was at a particular distribution center or was on a particular vehicle.

As further elaborated on below, this and other location event information obtained from the carrier may additionally or alternatively be included on one or more of the charts and/or graphs generated for a user so as to provide the user with insight into how particular location events impacted the process being monitored. It should be appreciated that such location event information can additionally or alternatively be obtained in other ways, and the invention is not limited to the use of any particular technique for obtaining it. For example, as mentioned above, the RF units 702, 704 can be used to obtain location event information, or to cause RFID tags associated with products to store location event information transmitted by such units.

Additionally or alternatively, RFID tags or barcodes may be associated with products so that, as the products pass through certain locations at which RFID interrogators or bar code readers are disposed or employed, location event information for the products may be accumulated by tracking locations and times at which the RFID tags or bar codes are read. As another option, the sensors 102 may additionally or alternatively be equipped or associated with GPS receivers that track the location of a product versus time. In some embodiments, people could additionally or alternatively manually provide information concerning location events by keying appropriate data into a computer system as products pass through particular locations, or a paper based system could even be employed, with people creating documents reflecting location events for products as the products pass through particular locations, and information from such documents later being manually entered into a computer system.

In some embodiments, accumulated location event information, and perhaps other information as well, may additionally or alternatively be employed to authenticate the pedigree and integrity of transported items. Systems and techniques for accomplishing such a result are described in U.S. Provisional Application Ser. No. 60/564,402, filed Apr. 22, 2004, the entire disclosure of which is hereby incorporated herein by reference.

Moreover, in some embodiments, techniques may additionally or alternatively be employed to predict the remaining shelf life of a product based upon accumulated sensor data. Examples of systems and methods for doing this are described in U.S. Provisional Application Ser. No. 60/526,878, filed Dec. 4, 2003, the entire disclosure of which is hereby incorporated herein by reference.

As mentioned above, it is common for a shipper to transmit an advanced shipping notification (ASN) to a receiver in advance of shipping a quantity of product via one or more carriers. In one embodiment of the present invention, this ASN may also be transmitted, e.g., via a network cloud 706 (FIG. 7), from the computer 118 at the shipping location 106 to the database 112 at the remote location 114, or may be forwarded from the computer 120 at the receiving location 108 to the database 112 after being received from the shipping location 106.

It should be appreciated that the network cloud 706 depicted in the example shown may be any network or combination of separate or integrated networks, or other communication links, suitable for transmitting information between and/or amongst the various computers/servers 118, 120, 124, 126 in the system. The network cloud 706 may, for example, represent the Internet. It should further be appreciated that each of the computers/servers 118, 120, 124, 126 may itself comprise multiple computers operating together, or may be a part of a larger computer system or network. As shown in the example ASN format attached as Appendix A to U.S. Provisional Application Ser. No. 60/500,565, incorporated by reference above, the ASN may include a wide variety of details concerning the product 104 being shipped, the manner in which the shipment is to take place, and the entities responsible for or involved in buying, selling, and shipping the product 104.

In accordance with one aspect of the present invention, the ASN may be modified or appended to contain one or more codes that uniquely identify the sensors 102 that are associated with the product 104 being shipped. The codes may, for example, be serial numbers unique to the sensors 102, or may be unique "trip numbers," which would enable the same sensors 102 to each be used for multiple trips. In some embodiments, the ASN may also include information reflecting where the sensors 102 are physically positioned with respect to the product 104 and/or with respect to the container and/or vehicle in which the product 104 is transported. For example, the ASN may specify that a sensor 102 is disposed on the lower left-hand side of pallet number three, in container number thirty seven, within truck number nine hundred and eighty two. In addition, as noted above, the ASN may contain tracking code(s) that may be used to retrieve location event information from the carrier(s) responsible for shipping the product 104.

In alternative embodiments, the ASN stored in the database 112 may be linked to data from a sensor 102 in ways other than by including sensor identification information in the ASN. For example, information that links the data from one or more sensors 102, or other data reflecting a monitored physical or environmental condition or location of a product 104, to a particular ASN may instead be transmitted and stored in the database 112 along with that data. The document identifier field "206" of the example ASN format shown in Appendix A of U.S. Provisional Application Ser. No. 60/500, 565 (incorporated by reference above) may, for example, be stored along with sensor data to provide such a link.

As discussed in more detail below, because ASN information may be stored in the database 112 and linked with condition (e.g., temperature) and/or other information (e.g., trip time, time spent at particular product locations, and/or trip distance) for a particular shipment of product 104, any of the numerous details reflected in the ASN may be used to generate reports for review by a person monitoring one or more characteristics of the shipment. In addition, the ASN information may be made available to the reviewer as he or she is reviewing those reports, so as to provide easy access to information respecting a particular shipment, upon request, in a format with which the reviewer is already familiar.

After conditioned data has been stored in the database 112 along with at least some information indicating certain parameters of the trips with which the conditioned data is associated, e.g., using ASN information and/or location event information, a number of charts, graphs, and other reports may be generated based upon that data to provide personnel reviewing them with useful insight into various aspects of the process being monitored (e.g., the cold chain). In one embodiment, data from all legs of a company's supply and distribution network can be accumulated as matter of course, so that reports may be generated for a user, automatically or upon request, with one or more parameters for such reports being selected by the user. For example, a person may use a computer 128 (FIG. 7) to access a website maintained on the server 126 at the remote location 114, and through that website may select from a list of standard report options, or may request that a customized report be prepared. In response to the user's selections, the server 126 may identify and retrieve the data from the database 112 that should be used in generating the report, and then generate the requested report based on the selected data. This should be contrasted with the prior art system 100 discussed above, in which reports were generated in advance, independent of the user accessing the website on the server 126, thereby giving the user access to only a predefined set of pre-generated charts and graphs via corresponding hyperlinks.

Figure 8:
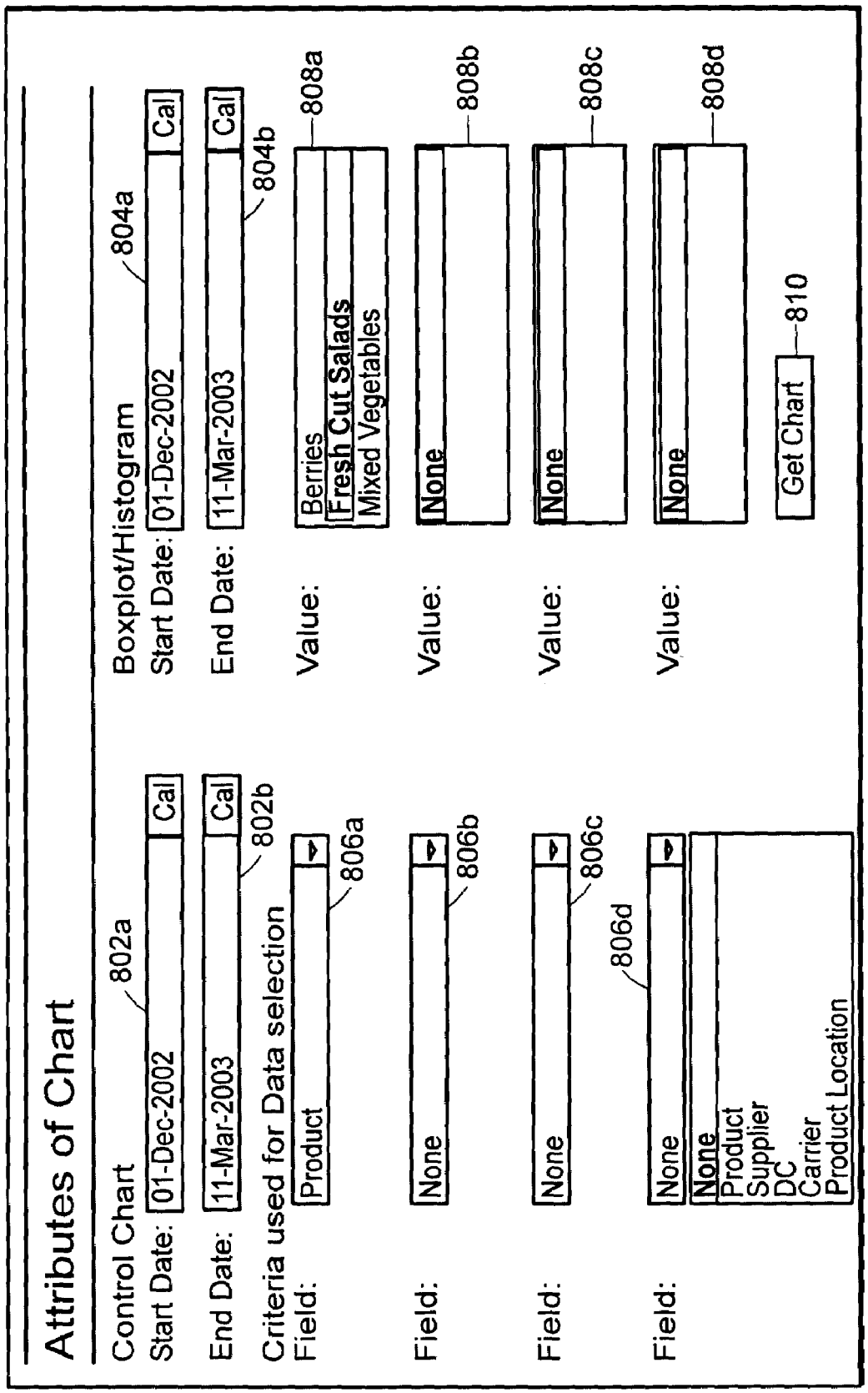
FIG. 8 shows an example user interface screen that may be presented to a user to permit the user to select various parameters upon which one or more reports reflecting a statistical analysis of a supply chain will be based.

An example of a menu that may be presented to a user for the purpose of specifying various attributes of a report to be generated is shown in FIG. 8. In the example shown, the user is permitted to select (using fields 802a-b, and 804a-b) date ranges for the data that will be used in generating the report. In addition, the user is permitted to select (using fields 806a-d) from among a number of other criteria upon which data from the database 112 may be selected for inclusion. As shown, each of the fields 806a-d may be provided with a pull-down menu that permits the user to select from among a group of predefined criteria. The predefined criteria that are made available may be determined for a particular user based upon the data that has been stored in the database 112, and the particular needs of that user.

In embodiments in which ASN information for a shipment of product 104 is stored in the database 112 and linked with information reflecting changes in a physical or environmental condition or location of the product 104 during the shipment, the predetermined criteria used may be any of the large number of attributes for the shipment reflected in the ASN. In the illustrative example shown, the criteria available for selection in the fields 806a-d include "product type," "supplier," "distribution center," "carrier," and "product location" (e.g., a particular warehouse or vehicle). In alternative embodiments, a larger or smaller number of criteria, or even all possible criteria, by which the data in the database 112 can be segregated, conceivably by using any field contained in the ASN associated with that data, can be presented to the user as possible data selection criteria.

As shown, when the user selects any one of the criteria, the possible values associated with that criterion may be presented in a corresponding field 808a-d. In some embodiments, the possible values presented in the fields 808a-d may be automatically extracted from the stored ASN information, based on the selection made in the corresponding field 806a-d. In other embodiments, the content of the fields 808a-d may be determined ahead of time.

In any event, in the example shown, the selection of "product" in the field 806a has caused a number of different types of products to be displayed in the field 808a, and the user has selected "fresh cut salads." In addition, the user has indicated that only data collected between the dates of Dec. 1, 2002 and Mar. 11, 2003 should be used for generation of both control charts and box plots/histograms. Although not illustrated, the user could alternatively have selected one or more additional or different criteria in the fields 806a-d for use in selecting the data to be used in generating one or more reports. For example, the user may have specified that only data corresponding with shipments of "mixed vegetables" that were shipped by "PDQ Carrier" from "ABC Supplier" to "XYX Distribution Center" should be used in generating reports. In the example shown, after the user has made the desired selections in fields 802-808, the user may click on a button 810 to request that reports be generated using data selected in accordance with the specified criteria.

Figure 9:
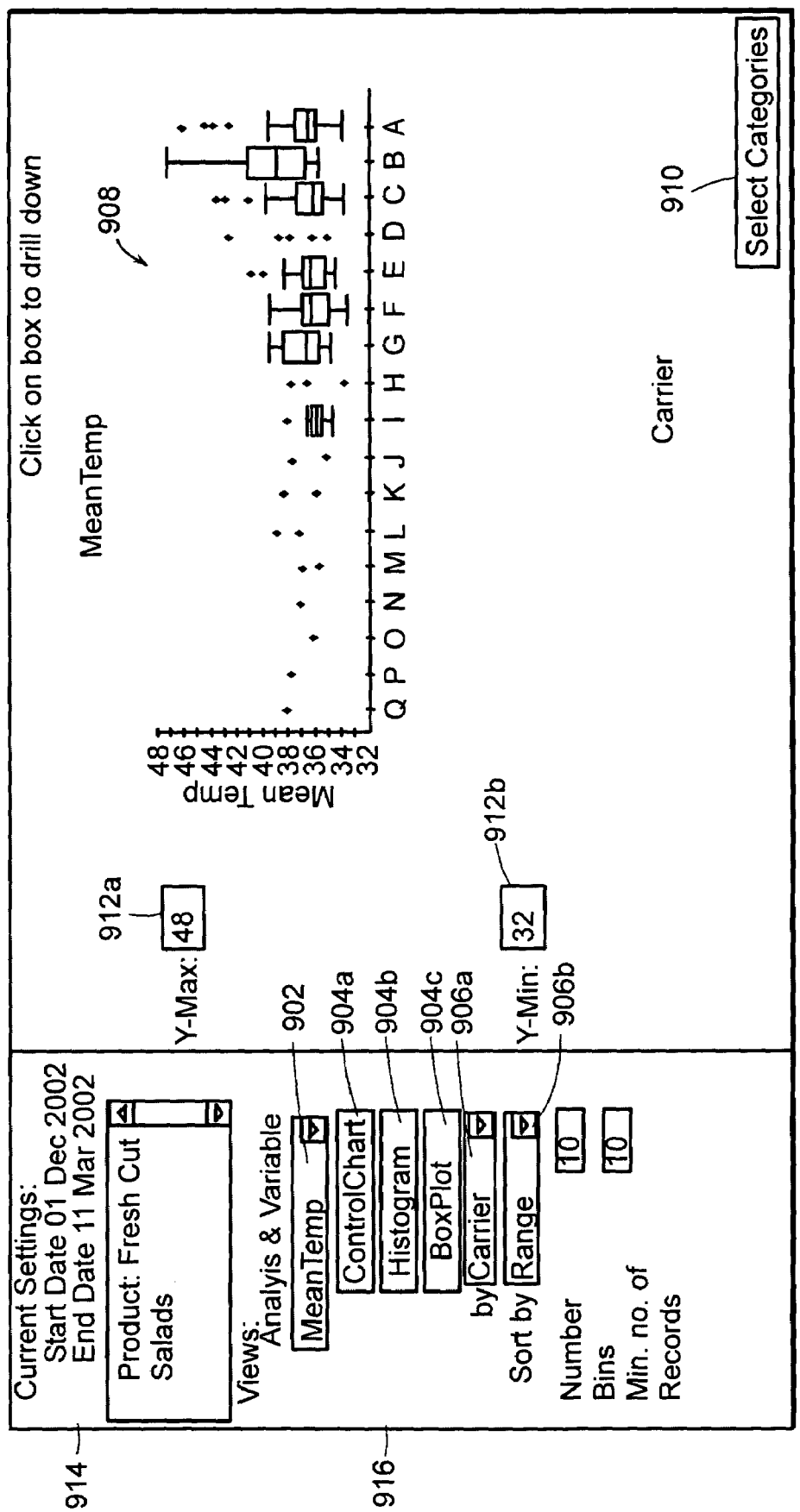
FIG. 9 shows an example of a set of box plots that may be automatically generated based upon a statistical analysis of accumulated temperature data in accordance with one aspect of the invention.

FIG. 9 shows an illustrative example of how a chart or graph may be first be presented to the user in response to the user clicking on the button 810 (FIG. 8). As shown, information may be displayed in a first region 914 of the screen that reflects the "settings" that have been selected by the user (FIG. 8). In addition, in a second region 916 of the screen, the user may be given a number of options that permit the user to select or alter the formatting and configuration of generated charts and/or graphs.

As a first option in the illustrated example, the user may select (using pull-down menu 902) a variable that the generated chart or graph will be based upon. In the example shown, the user has selected "mean temperature" as the analysis variable. It should be appreciated, however, that any of a virtually unlimited number of analysis variables can additionally or alternatively be used, and the invention is not limited to the use of any particular variable. As but a few examples, in addition to or lieu of "mean temperature," the user could have selected minimum temperature, maximum temperature, degree-minutes above a threshold temperature, degree-minutes below a threshold temperature, time above a threshold temperature, time below a threshold temperature, trip time, trip distance, or time spent at product locations (e.g., a particular warehouse or vehicle). Moreover, in embodiments in which conditions other than temperature are additionally or alternatively monitored, e.g., humidity, incident light, exposure to x-rays or other radiation, pressure, shock, impact, presence or quantity of airborne particles, viscosity, volume, speed, acceleration, orientation, etc., similar variables related to such conditions may be presented as options in field 902.

Next, in the example of FIG. 9, the user is given the option of selecting from among a number of types of charts and graphs that may be generated and displayed. Any of a number of different types of charts or graphs may be used, and the invention is not limited to any particular type of chart or graph. In the illustrative example shown, the user is permitted to select a "control chart," a "histogram," or a "box plot" for display. The basic format for these three types of charts and graphs may be essentially the same as that discussed above in the "Background" section of this disclosure.

For the box plot option, the user may be permitted to select the basis upon which the generated box plots will be segregated and/or sorted. In the example shown in FIG. 9, this functionality is enabled by the pull-down menus 906a-b. Specifically, the pull-down menu 906a may permit the user to select a criterion that determines how the generated box plots will be segregated, and the pull-down menu 906b may determine how the segregated box plots will be sorted on the screen. In the example shown, the user has requested that the box plots be segregated by product carrier, i.e., that a separate box plot be generated for each carrier that transported "fresh cut salads" between Dec. 1, 2002 and Mar. 11, 2003, and has requested that the generated box plots be sorted based upon the ranges of data values included in them.

Like the criteria available for selection in the fields 806a-d, the box plots may be segregated in any number of ways, and the invention is not limited for any particular criterion for segregation. They may, for instance, be segregated by "product," "supplier," "distribution center," "carrier," "product location," or any other distinguishing criterion.

As a result of these selections, the generated chart 908 shows a respective box plot for each of 17 different carriers (A-Q) that shipped the selected product during the selected dates, with the box plots being generated based upon the mean temperature values measured during those shipments. In this example, the box plots are sorted so that the box plot for the carrier having the smallest range between the highest and lowest mean temperature values (i.e., carrier Q) is on the left and the carrier having the largest range between the highest and lowest mean temperature values (i.e., carrier A) is on the right.

As an option, the user may click on the "select categories" button 910, so as to be given the ability to select a smaller group, or even one, of the displayed box plots for display. This may be useful, for example, if the number of box plots displayed causes the box plots to be so small that they are difficult to evaluate, or if only a few different box plots are of interest. In addition, the high and low values of the selected variable (mean temperature in the example shown) may be altered using the fields 912a-b.

Figure 10:
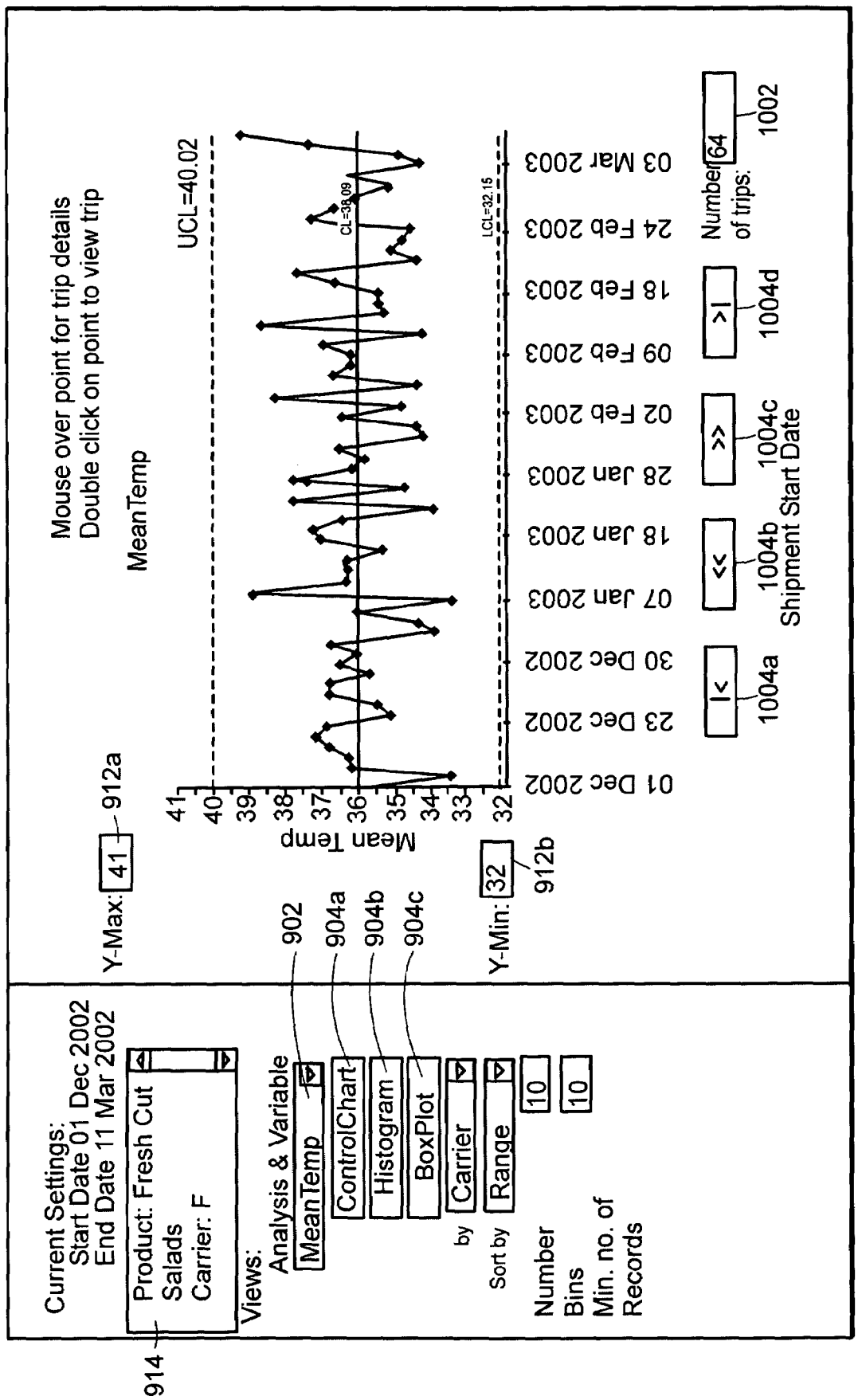
FIG. 10 shows an example of a control chart that may be automatically generated based upon a statistical analysis of accumulated temperature data in accordance with one aspect of the invention.

When box plots such as those shown it FIG. 9 are displayed, the user may click on one of them to drill down to one or more charts or graphs generated based on the same data upon which the clicked-on box plot was based. FIG. 10 illustrates an example of one such graph (a control chart) that may be displayed when a box plot (carrier "F" in the example show) is clicked on in this manner. As shown, in addition to displaying a control chart for the selected variable (mean temperature), the settings information in region 914 may indicate that data from carrier "F" has been selected. At this stage, the user may also click on the histogram button 904b or the box plot button 904c and have displayed a histogram or box plot that is also limited to the data from carrier "F." It should be appreciated that these same box plots, control charts, and histograms could also have been generated if "carrier" had been selected in one of the fields 806b-d, and "F" had been selected in the corresponding one of the fields 808b-d when the menu of FIG. 8 was presented to the user. When viewing the box plot under the above circumstances (i.e., after having clicked on a box plot for a particular carrier), the user may click on the select categories button 910 so as to re-broaden the box plot chart to include box plots for additional, or perhaps all, carriers once again.

Referring again to FIG. 10, the analysis variable (field 902) may be altered (e.g., to "time above a threshold," or "trip time," etc.), so as to alter the informational content of the control chart displayed. The data to be used in generating such a modified graph would be selected based upon the content of the settings information in the region 914. In addition, the high and low values of the selected variable and the number of data points displayed on the screen may be altered using the fields 912*a-b* and 1004, respectively, and the portion of the graph that is displayed may be altered using the buttons 1004*a-d*.

Figure 11:
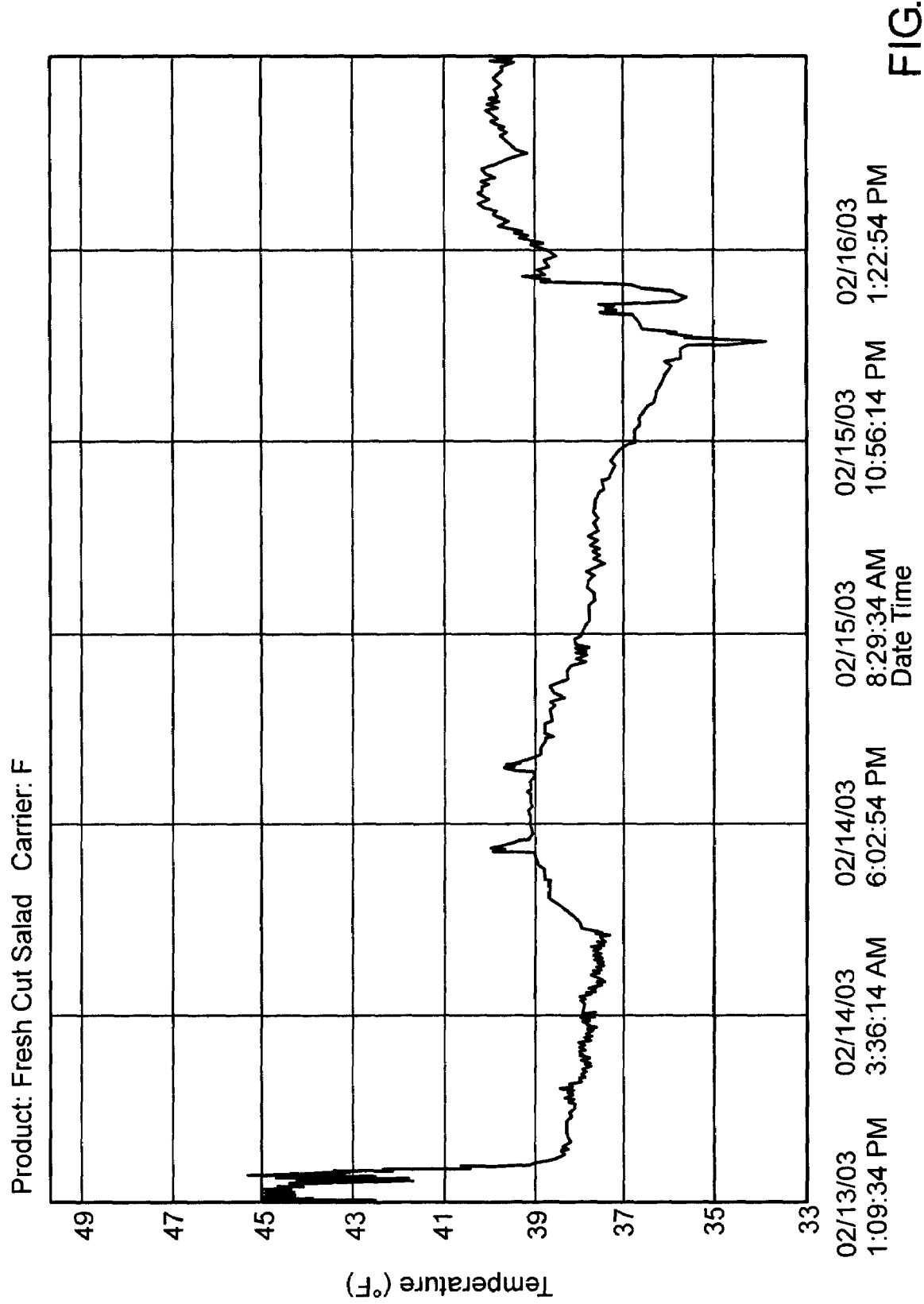
FIG. 11 shows an example of a temperature graph for a single shipment that may, for example, be accessed by clicking on one of the points in the control chart of FIG. 10.

In some embodiments, by clicking on one of the data points in a control chart such as that shown in FIG. 10, the user may drill down to a graph reflecting data upon which the clicked-on data point was based. The graph of FIG. 11 shows an example of how temperature profile data corresponding to a point on the graph of FIG. 10 may appear. In the example shown, the graph represents the temperature that was monitored during a particular shipment of "fresh cut salads" transported by the carrier "F."

In addition to or in lieu of such a graph, much useful information (not shown) concerning details of the monitored shipment may be displayed. Indeed, virtually any information from a corresponding ASN stored in the database 112, and/or stored location event information, may be displayed for review at this stage. Moreover, in addition to or in lieu of the foregoing, summary data extracted from the downloaded sensor data for the selected trip or product location (e.g., a particular warehouse or vehicle) may be displayed to the user when one of the points on a control chart is clicked on or otherwise selected.

Figure 12:
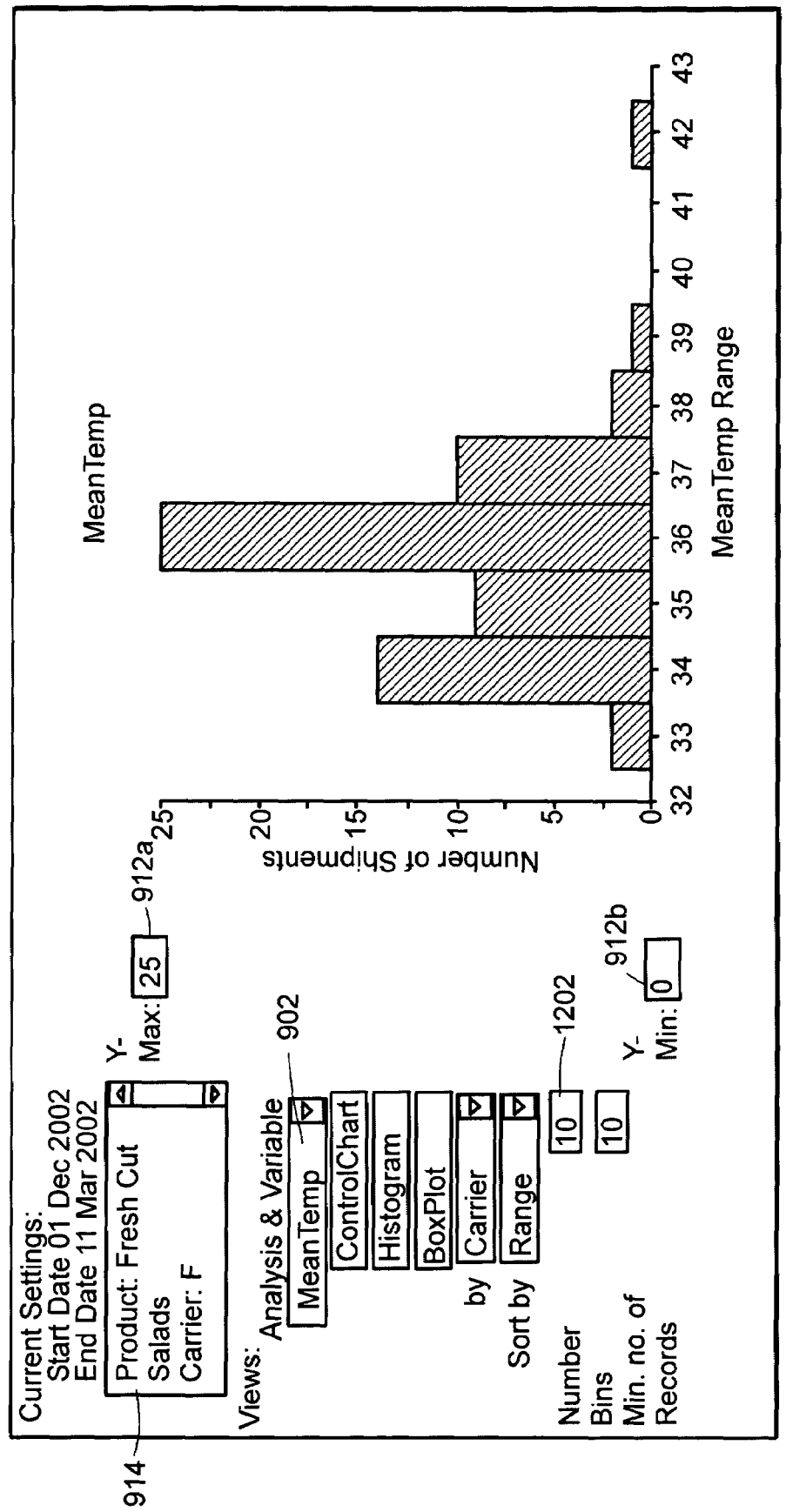
FIG. 12 shows an example of a histogram that may be automatically generated based upon a statistical analysis of accumulated temperature data in accordance with one aspect of the invention.

FIG. 12 illustrates an example of another type of chart (a histogram) that may be displayed when one of a number of displayed box plots (carrier "F" in the example shown) is clicked on. For a histogram, the value in the "number of bins" field 1202 may be used to determine the number of "bins" (or bars) that the histogram will include. In addition, like in the previous examples, the analysis variable in field 902, as well as the values in the fields 912*a-b*, may be altered to alter the content and appearance of the histogram.

Referring back to FIG. 9, when the "histogram" button 904*b* or "control chart" button 904*a* is clicked on directly, without first drilling down from the displayed box plots, a histogram like that shown in FIG. 12 may be generated based on all of the data selected from the menu of FIG. 8, rather than from only a selected portion of that data. The histogram generated in such a circumstance may therefore include, for example, data from all carriers that transported "fresh cut salad" during the selected dates, rather than data from only a single carrier. In such a case, the information displayed in the current settings region 914 may be caused to indicate that data from "all" carriers has been selected.

As discussed above, in addition to ASN information, location event information, either retrieved from a carrier or gathered in some other manner, may also be stored in the database 112 and used during the generation of reports. An example of how such a report may appear is illustrated in FIG. 13. The graph and chart of FIG. 13 together communicate useful information not only concerning the temperature profile measured during shipment of a product between a shipping location (origin) and a receiving location (destination), but also concerning the times and places at which certain events occurred (e.g., times at which the monitored product was loaded onto and off of particular airplanes or other vehicles). In some embodiments, detailed information concerning the shipment with which the graph is associated, e.g., the information under the heading "Shipment Information" in FIG. 13, may be derived from the ASN information stored in the database 112.

As noted above, in addition or in lieu of generating reports in response to user requests, at least some reports may be generated automatically on a regular basis (e.g., once a day, once a week, once a month, etc.), or perhaps in response to the occurrence of certain events, such as the accumulation of a new piece of data, or ten new pieces of data, etc. In addition, for at least some types of reports, e.g., a control chart such as that shown in FIG. 10, the automatically generated reports may also be automatically analyzed after they are generated so as to automatically identify patterns indicative of inefficiencies or anomalies in the process. Examples of patterns in a control chart that may be indicative of potentially anomalous conditions or trends are discussed above in the "Background" section of this disclosure. It should be appreciated, however, that in contrast to the prior art system discussed above, embodiments of the present invention that perform such automated analysis of control charts or other reports do not require a human being to visually inspect the reports to identify such patterns, thereby greatly increasing the efficiency and effectiveness of the analysis process. It should further be appreciated that any of a number of other patterns or conditions could additionally or alternatively be looked for, and the invention is not limited to the particular patterns mentioned herein.

In some embodiments, whenever such a pattern or condition is identified pursuant to such automated analysis, one or more users may be notified automatically, e.g., by e-mail, pager, fax, phone, etc., so that they may promptly and efficiently access one or more reports reflecting the identified pattern. In the case of e-mail, the user may be provided with an appropriate hyperlink enabling the user to quickly access the report containing the identified pattern. Notified individuals may then, if appropriate, promptly take remedial measures and potentially avoid serious consequences resulting from the identified anomaly. The reported information may further enable the notified individuals to proactively avoid similar or related anomalous situations in the future by manipulating or revamping various aspects of the process.

In some embodiments, each notified individual may be given the opportunity to respond to the notification with an acknowledgement indicating that they received it. The acknowledgment may optionally include information such as the time it was transmitted, the nature or severity of the condition—possibly assessed after the individual has reviewed one or more reports, and what corrective action should be or has been taken. When an acknowledgement is not received within a certain period of time, one or more other individuals, e.g., a supervisor, may be automatically notified in an effort to escalate the issue and ensure that the condition is dealt with promptly and appropriately.

As another option, the above-discussed reports may be automatically generated so as to take into account data accumulated during some past period. For example, the control limits of a control chart may be adjusted based on data accumulated during the previous week, thirty days, sixty days, etc., so as to more accurately differentiate between common cause variations and "out of control" points. Moreover, alarm notifications may be sent to appropriate individuals (as discussed above) if the control limits are automatically adjusted too far, e.g., if one of them was assigned a value outside of a predefined acceptable range.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A method for performing statistical analysis on at least one monitored aspect of a product supply chain, comprising steps of:

physically associating at least one first sensor with at least one first item to monitor changes in at least one aspect of a first shipment comprising at least one physical or environmental condition of the at least one first item, the at least one first sensor being physically associated with the at least one first item such that the at least one first sensor remains physically associated with the at least one first item in the same way before and after the at least one first item is loaded onto or removed from a vehicle carrying the at least one first item during the first shipment;

storing, in memory accessible to at least one processor, first data reflecting the at least one physical or environmental condition of the first shipment of the at least one the first item occurring in the supply chain;

physically associating at least one second sensor with at least one second item to monitor changes in at least one monitored aspect of a second shipment comprising a physical or environmental condition of the at least one second item, the at least one second sensor being physically associated with the at least one second item such that the at least one second sensor remains physically associated with the at least one second item in the same way before and after the at least one second item is loaded onto or removed from a vehicle carrying the at least one second item during the second shipment;

storing, in memory accessible to the at least one processor, second data reflecting the at least one physical or environmental condition of the second shipment of the at least one second item occurring in the supply chain; and using the at least one processor to automatically generate at least one report reflecting a statistical analysis of the first data and the second data.

2. The method of claim 1, wherein: the at least one monitored aspect of the first shipment comprises a temperature of an environment in which the at least one first item was disposed during the first shipment; and the at least one monitored aspect of the second shipment comprises a temperature of an environment in which the at least one second item was disposed during the second shipment.

3. The method of claim 1, wherein: the at least one monitored aspect of the first shipment comprises a trip time of the first shipment; and the at least one monitored aspect of the second shipment comprises a trip time of the second shipment.

4. The method of claim 1, wherein: the at least one monitored aspect of the first shipment comprises a trip distance of the first shipment; and the at least one monitored aspect of the second shipment comprises a trip distance of the second shipment.

5. The method of claim 1, wherein the first and second shipments originated at different locations.

6. The method of claim 1, wherein the first and second shipments originated at the same location.

7. The method of claim 1, wherein the first and second shipments arrived at different locations.

8. The method of claim 1, wherein the first and second shipments arrived at the same location.

9. The method of claim 1, wherein the at least one report comprises a control chart.

10. The method of claim 1, wherein the at least one report comprises a histogram.

11. The method of claim 1, wherein the at least one report comprises a box plot.

12. The method of claim 1, wherein: the method further comprises steps of storing, in memory accessible to the at least one processor, an electronic copy of a first advanced shipping notification (ASN) that was transmitted from a shipping location for the first shipment to a receiving location for the first shipment in advance of sending the first shipment, and storing, in memory accessible to the at least one processor, an electronic copy of a second ASN that was transmitted from a shipping location for the second shipment to a receiving location for the second shipment in advance of sending the second shipment; and the step (c) further comprises using at least some information from the first ASN stored in memory and at least some information from the second ASN stored in memory to automatically generate the at least one report reflecting the statistical analysis of the first data and the second data.

13. The method of claim 1, wherein: the method further comprises steps of storing, in memory accessible to the at least one processor, first location event information concerning the first shipment, and storing, in memory accessible to the at least one processor, second location event information concerning the second shipment; and the step (c) further comprises using at least some of the first location event information stored in memory and at least some of the second location event information stored in memory to automatically generate the at least one report reflecting the statistical analysis of the first data and the second data.

14. The method of claim 1 wherein the first and second items are transported during the first and second shipments, respectively, on different vehicles.

15. The method of claim 1, wherein: the method further comprises a step of receiving, at the at least one processor, a request from a user for the at least one report reflecting the statistical analysis of the first data and the second data, the request including at least one user-selected parameter for the at least one report; and the step (c) further comprises automatically generating the at least one report with the at least one processor in response to receiving the request, the at least one report being generated in accordance with the at least one user-selected parameter.

16. The method of claim 15, wherein the step (c) further comprises: in response to receiving the request, combining first summary information extracted from the first data with second summary information extracted from the second data to yield at least one parameter for the at least one report.

17. The method of claim 16, wherein each of the first summary information and the second summary information comprises at least one of a mean temperature, a minimum temperature, a maximum temperature, degree-minutes above a threshold temperature, degree-minutes below a threshold temperature, time above a threshold temperature, and time below a threshold temperature.

18. The method of claim 16, wherein the first summary information and the second summary information reflect at least one physical or environmental condition of the at least one first item and the at least one second item, respectively, at only a single product location.

19. The method of claim 16, wherein each of the first summary information and the second summary information comprises at least one of trip time, trip distance, and time spent at a particular product location.

20. The method of claim 15, wherein the at least one user-selected parameter comprises at least one date range for data, such that the at least one report is generated using data only within the at least one date range.

21. The method of claim 15, wherein the at least one user-selected parameter comprises a list of one or more originating locations of monitored shipments, such that the at least one report is generated using data corresponding only to shipments that originated at the one or more originating locations on the list.

22. The method of claim 15, wherein the at least one user-selected parameter comprises a list of one or more receiving locations of monitored shipments, such that the at least one report is generated using data corresponding only to shipments that arrived at the one or more receiving locations on the list.

23. The method of claim 15, wherein the at least one user-selected parameter comprises a list of one or more distribution centers for monitored shipments, such that the at least one report is generated using data corresponding only to shipments that went to, from or through the one or more distribution centers on the list.

24. The method of claim 15, wherein the at least one user-selected parameter comprises a list of one or more carriers responsible for transporting monitored shipments, such that the at least one report is generated using data corresponding only to shipments that were transported by the one or more carriers on the list.

25. The method of claim 15, wherein the at least one user-selected parameter comprises at least one first criterion upon which groups of data are to be segregated in the at least one report.

26. The method of claim 25, wherein the at least one user-selected parameter further comprises at least one second criterion upon which the segregated groups of data are to be sorted in the at least one report.

27. The method of claim 25, wherein the at least one first criterion comprises at least one of a carrier responsible for transporting monitored shipments, a shipping location at which monitored shipments originated, a receiving location at which monitored shipments arrived, a distribution center, and a product type.

28. The method of claim 15, wherein the at least one user-selected parameter determines a subset of data upon which the at least one report will be based.

29. A system for performing statistical analysis on at least one monitored aspect of a product supply chain, comprising:
at least one first sensor physically associated with at least one first item to monitor changes in at least one aspect of a first shipment comprising a physical or environmental condition of the first item, the at least one first sensor being physically associated with the at least one first item such that the at least one first sensor remains physically associated with the at least one first item in the same way before and after the at least one first item is loaded onto or removed from a vehicle carrying the at least one first item during the first shipment;
at least one second sensor physically associated with at least one second item to monitor changes in at least one aspect of a second shipment comprising a physical or environmental condition of the second item, the at least one second sensor being physically associated with the at least one second item such that the at least one second sensor remains physically associated with the at least one second item in the same way before and after the at least one second item is loaded onto or removed from a vehicle carrying the at least one second item during the second shipment;
at least one memory having stored therein:
first data reflecting the at least one physical or environmental condition of the first shipment of the at least one first item occurring in the supply chain; and
second data reflecting the at least one physical or environmental condition of the second shipment of the at least one second item occurring in the supply chain; and
at least one processor, coupled to the at least one memory, configured to automatically generate at least one report reflecting a statistical analysis of the first data and the second data.

30. The system of claim 29, wherein: the at least one monitored aspect of the first shipment comprises a temperature of an environment in which the at least one first item was disposed during the first shipment; and the at least one monitored aspect of the second shipment comprises a temperature of an environment in which the at least one second item was disposed during the second shipment.

31. The system of claim 29, wherein: the at least one monitored aspect of the first shipment comprises a trip time of the first shipment; and the at least one monitored aspect of the second shipment comprises a trip time of the second shipment.

32. The system of claim 29, wherein: the at least one monitored aspect of the first shipment comprises a trip distance of the first shipment; and the at least one monitored aspect of the second shipment comprises a trip distance of the second shipment.

33. The system of claim 29, wherein the first and second shipments originated from different locations.

34. The system of claim 29, wherein the first and second shipments originated at the same location.

35. The system of claim 29, wherein the first and second shipments arrived at different locations.

36. The system of claim 29, wherein the first and second shipments arrived at the same location.

37. The system of claim 29, wherein the at least one report comprises a control chart.

38. The system of claim 29, wherein the at least one report comprises a histogram.

39. The system of claim 29, wherein the at least one report comprises a box plot.

40. The system of claim 29, wherein: the at least one memory has stored therein an electronic copy of a first advanced shipping notification (ASN) that was transmitted from a shipping location for the first shipment to a receiving location for the first shipment in advance of sending the first shipment, and has further stored therein an electronic copy of a second ASN that was transmitted from a shipping location for the second shipment to a receiving location for the second shipment in advance of sending the second shipment; and the at least one processor is further configured to use at least some information from the first ASN stored in memory and at least some information from the second ASN stored in memory to automatically generate the at least one report reflecting the statistical analysis of the first data and the second data.

41. The system of claim 29, wherein: the at least one memory has stored therein first location event information concerning the first shipment, and has further stored therein second location event information concerning the second shipment; and the at least one processor is further configured to use at least some of the first location event information stored in memory and at least some of the second location event information stored in memory to automatically generate the at least one report reflecting the statistical analysis of the first data and the second data.

42. The system of claim 29, wherein the first and second items are transported during the first and second shipments, respectively, on different vehicles.

43. The system of claim 29, wherein: the system further comprises at least one user input device configured to receive at least one command from a user requesting the at least one report reflecting the statistical analysis of the first data and the second data, the at least one command including at least one user-selected parameter for the report; and the at least one processor is further configured to automatically generate the at least one report in response to the user input device receiving the at least one command, the report being generated in accordance with the at least one user-selected parameter.

44. The system of claim 43, wherein the at least one processor is further configured to, in response to the user input device receiving the at least one command, combine first summary information extracted from the first data with second summary information extracted from the second data to yield at least one parameter for the at least one report.

45. The system of claim 44, wherein each of the first summary information and the second summary information comprises at least one of a mean temperature, a minimum temperature, a maximum temperature, degree-minutes above a threshold temperature, degree-minutes below a threshold temperature, time above a threshold temperature, and time below a threshold temperature.

46. The system of claim 44, wherein the first summary information and the second summary information reflect at least one physical or environmental condition of the at least one first item and the at least one second item, respectively, at only a single product location.

47. The method of claim 44, wherein each of the first summary information and the second summary information comprises at least one of trip time, trip distance, and time spent at a particular product location.

48. The system of claim 43, wherein the at least one user-selected parameter comprises at least one date range for data, such that the at least one report is generated using data only within the at least one date range.

49. The system of claim 43, wherein the at least one user-selected parameter comprises a list of one or more originating locations of monitored shipments, such that the at least one report is generated using data corresponding only to shipments that originated at the one or more originating locations on the list.

50. The system of claim 43, wherein the at least one user-selected parameter comprises a list of one or more receiving locations of monitored shipments, such that the at least one report is generated using data corresponding only to shipments that arrived at the one or more receiving locations on the list.

51. The system of claim 43, wherein the at least one user-selected parameter comprises a list of one or more distribution centers for monitored shipments, such that the at least one report is generated using data corresponding only to shipments that went to, from or through the one or more distribution centers on the list.

52. The system of claim 43, wherein the at least one user-selected parameter comprises a list of one or more carriers responsible for transporting monitored shipments, such that the at least one report is generated using data corresponding only to shipments that were transported by the one or more carriers on the list.

53. The system of claim 43, wherein the at least one user-selected parameter comprises at least one first criterion upon which groups of data are to be segregated in the at least one report.

54. The system of claim 53, wherein the at least one user-selected parameter further comprises at least one second criterion upon which the segregated groups of data are to be sorted in the at least one report.

55. The system of claim 53, wherein the at least one first criterion comprises at least one of a carrier responsible for transporting monitored shipments, a shipping location at which monitored shipments originated, a receiving location at which monitored shipments arrived, a distribution center to, for monitored shipments, and a product type.

56. The system of claim 43, wherein the at least one user-selected parameter determines a subset of data upon which the at least one report will be based.

57. A system for performing statistical analysis on at least one monitored aspect of a product supply chain, comprising:
first sensor means for monitoring changes in a physical or environmental condition of a first shipment of a first item, the first means being physically associated with the first item such that the first means remains physically associated with the first item in the same way before and after the first item is loaded onto or removed from a vehicle carrying the first item during the first shipment;
second means for monitoring changes in a physical or environmental condition of a second shipment of a second item, the second means being physically associated with the second item such that the second means remains physically associated with the second item in the same way before and after the second item is loaded onto or removed from a vehicle carrying the second item during the second shipment;
means for storing first data reflecting the physical or environmental condition of the first shipment of the first item occurring in the supply chain;
means for storing second data reflecting the physical or environmental condition of the second shipment of the second item occurring in the supply chain; and
means, coupled to the means for storing first data and the means for storing second data, for automatically generating at least one report reflecting a statistical analysis of the first data and the second data.

* * * * *